(12) United States Patent
Kawaguchi et al.

(10) Patent No.: US 11,503,177 B2
(45) Date of Patent: Nov. 15, 2022

(54) IMAGING DEVICE, IMAGING METHOD

(71) Applicant: Sony Group Corporation, Tokyo (JP)

(72) Inventors: Yuki Kawaguchi, Kanagawa (JP); Koji Ozaki, Kanagawa (JP); Masaya Kinoshita, Kanagawa (JP); Akira Iwase, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/639,334

(22) PCT Filed: Aug. 17, 2018

(86) PCT No.: PCT/JP2018/030550
§ 371 (c)(1),
(2) Date: Feb. 14, 2020

(87) PCT Pub. No.: WO2019/039404
PCT Pub. Date: Feb. 28, 2019

(65) Prior Publication Data
US 2021/0037162 A1 Feb. 4, 2021

(30) Foreign Application Priority Data

Aug. 21, 2017 (JP) .............................. JP2017-158510

(51) Int. Cl.
*H04N 1/21* (2006.01)
*H04N 5/232* (2006.01)
*H04N 101/00* (2006.01)

(52) U.S. Cl.
CPC ........... *H04N 1/2129* (2013.01); *H04N 1/215* (2013.01); *H04N 1/2125* (2013.01);
(Continued)

(58) Field of Classification Search
CPC .. H04N 1/2125; H04N 1/2129; H04N 1/2145; H04N 1/215; H04N 5/23219;
(Continued)

(56) References Cited

U.S. PATENT DOCUMENTS

2008/0079817 A1 4/2008 Murata et al.
2010/0026845 A1 2/2010 Kang et al.
(Continued)

FOREIGN PATENT DOCUMENTS

JP  2003-274323 A  9/2003
JP  2005-136855 A  5/2005
(Continued)

OTHER PUBLICATIONS

Japanese Notice of Allowance dated Jun. 29, 2021 for corresponding Japanese Application No. 2017-158510.

*Primary Examiner* — Daniel M Pasiewicz
(74) *Attorney, Agent, or Firm* — Michael Best & Friedrich LLP

(57) ABSTRACT

There is provided an imaging device including: a signal processing unit configured to cause a series of picture data being continuously acquired to be temporarily stored in a buffer memory area in a signal processing process, read out the series of picture data from the buffer memory area, and perform a subsequent signal processing; and a control unit configured to perform control for deleting at least a part of the picture data stored in the buffer memory area, on a basis of detecting a predetermined operation while the signal processing is being performed on the series of picture data by the signal processing unit.

18 Claims, 15 Drawing Sheets

(52) U.S. Cl.
CPC ....... *H04N 1/2145* (2013.01); *H04N 5/23219* (2013.01); *H04N 5/23229* (2013.01); *H04N 5/232941* (2018.08); *H04N 2101/00* (2013.01); *H04N 2201/218* (2013.01)

(58) Field of Classification Search
CPC ......... H04N 5/23229; H04N 5/232939; H04N 5/232941; H04N 2201/218
See application file for complete search history.

(56) References Cited

U.S. PATENT DOCUMENTS

2010/0220216 A1      9/2010  Fishman
2014/0300774 A1*   10/2014  Gwak .................. H04N 5/2625
                                                                 348/231.2

FOREIGN PATENT DOCUMENTS

JP          2010-028451 A      2/2010
JP          2010-226481 A    10/2020

* cited by examiner

[Fig. 1]
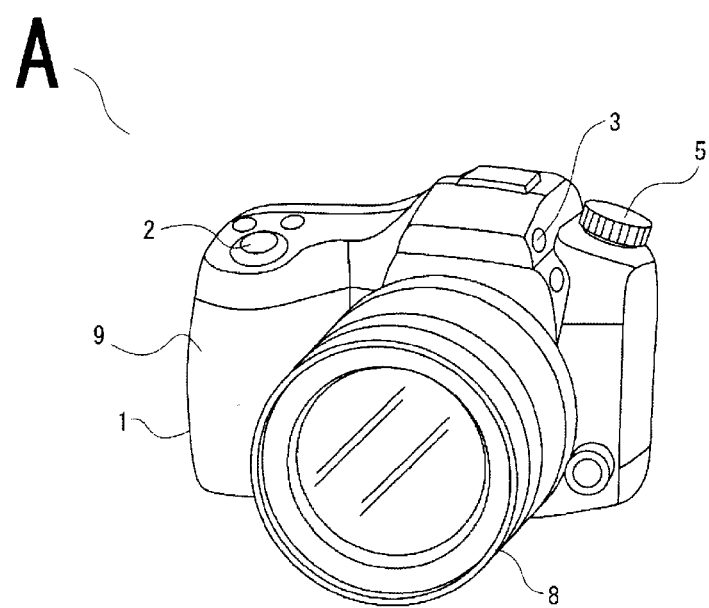
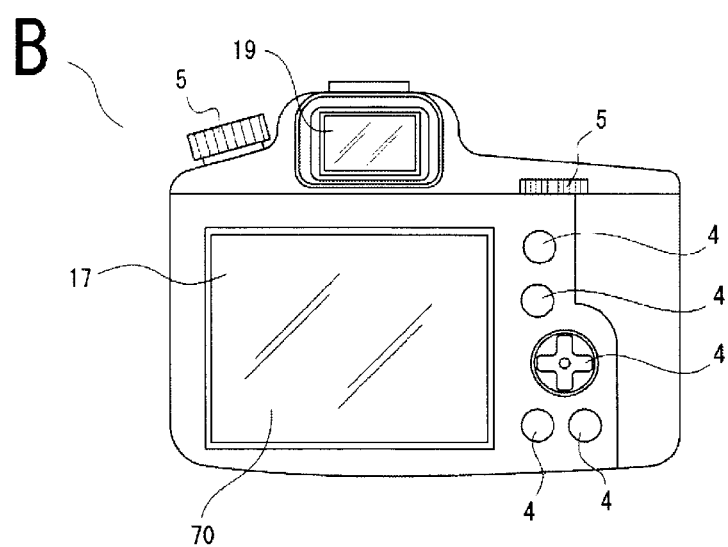

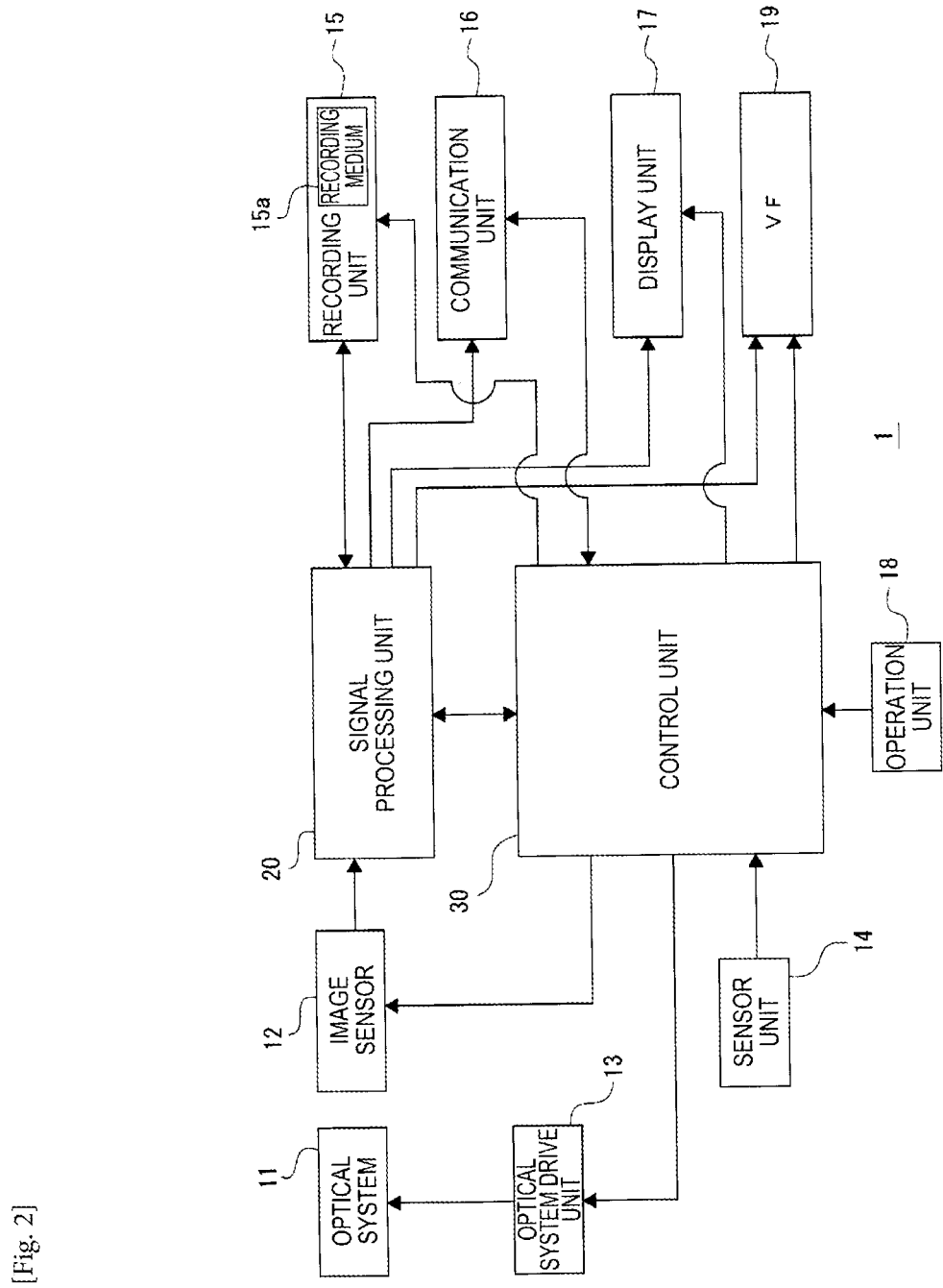
[Fig. 2]

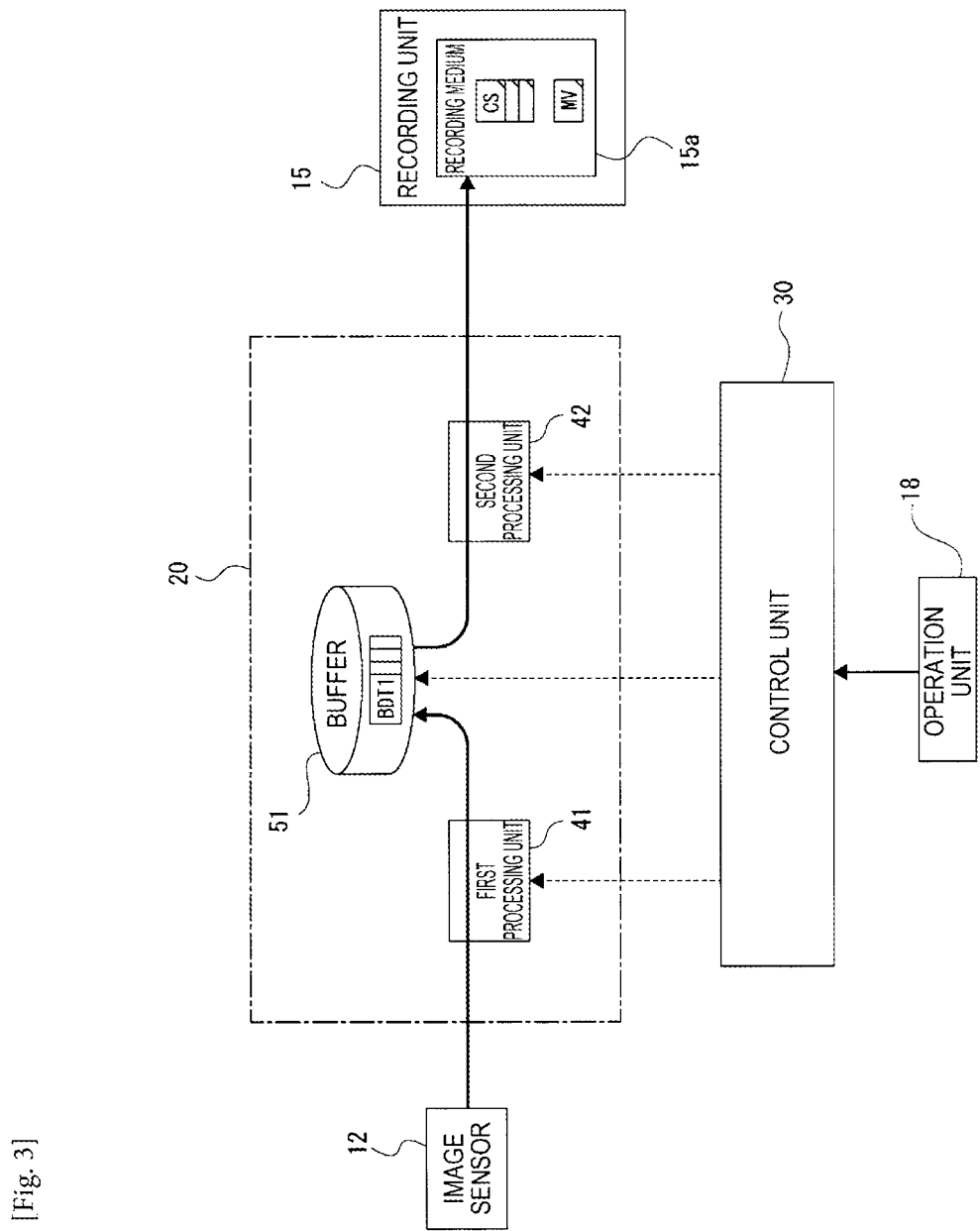
[Fig. 3]

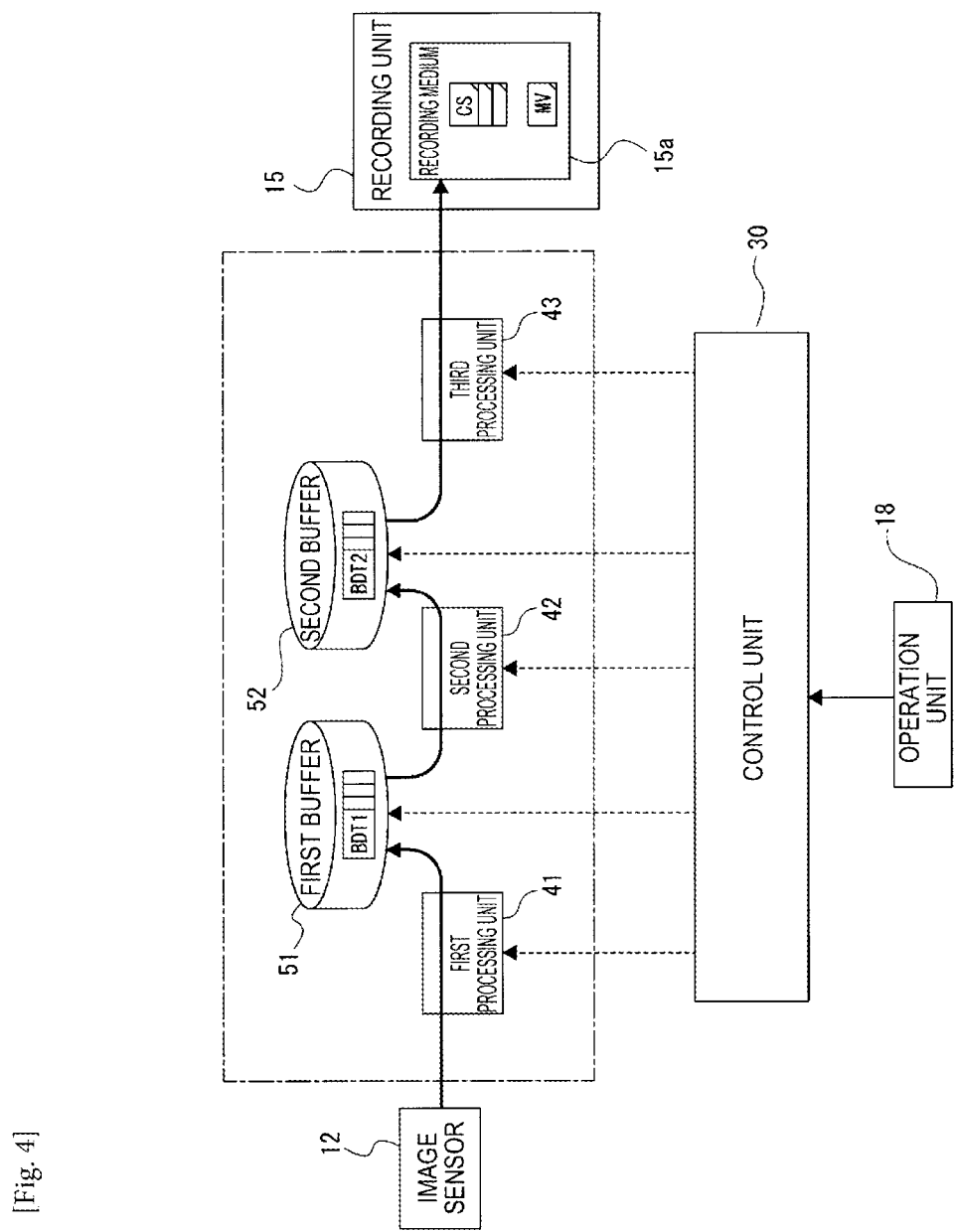

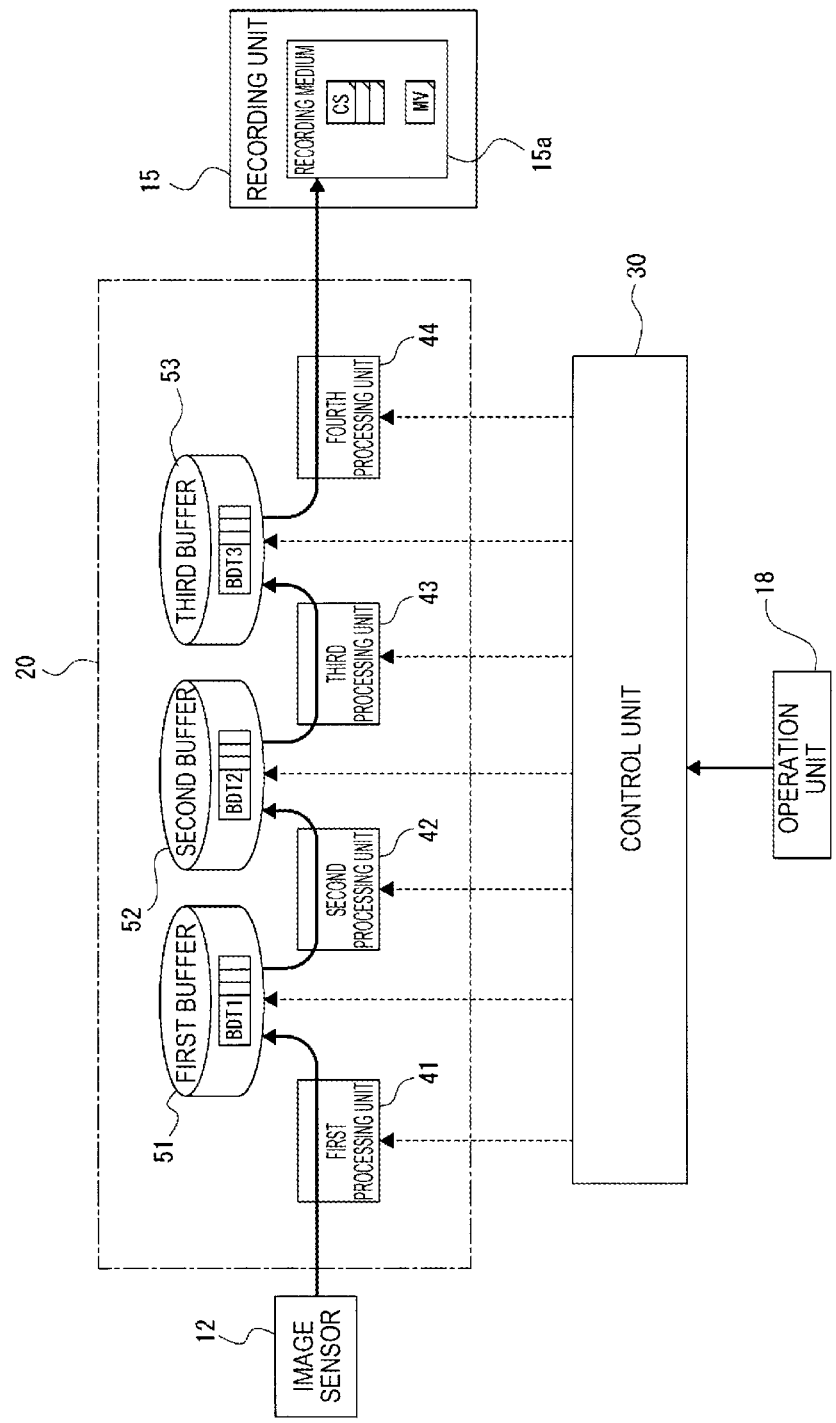
[Fig. 5]

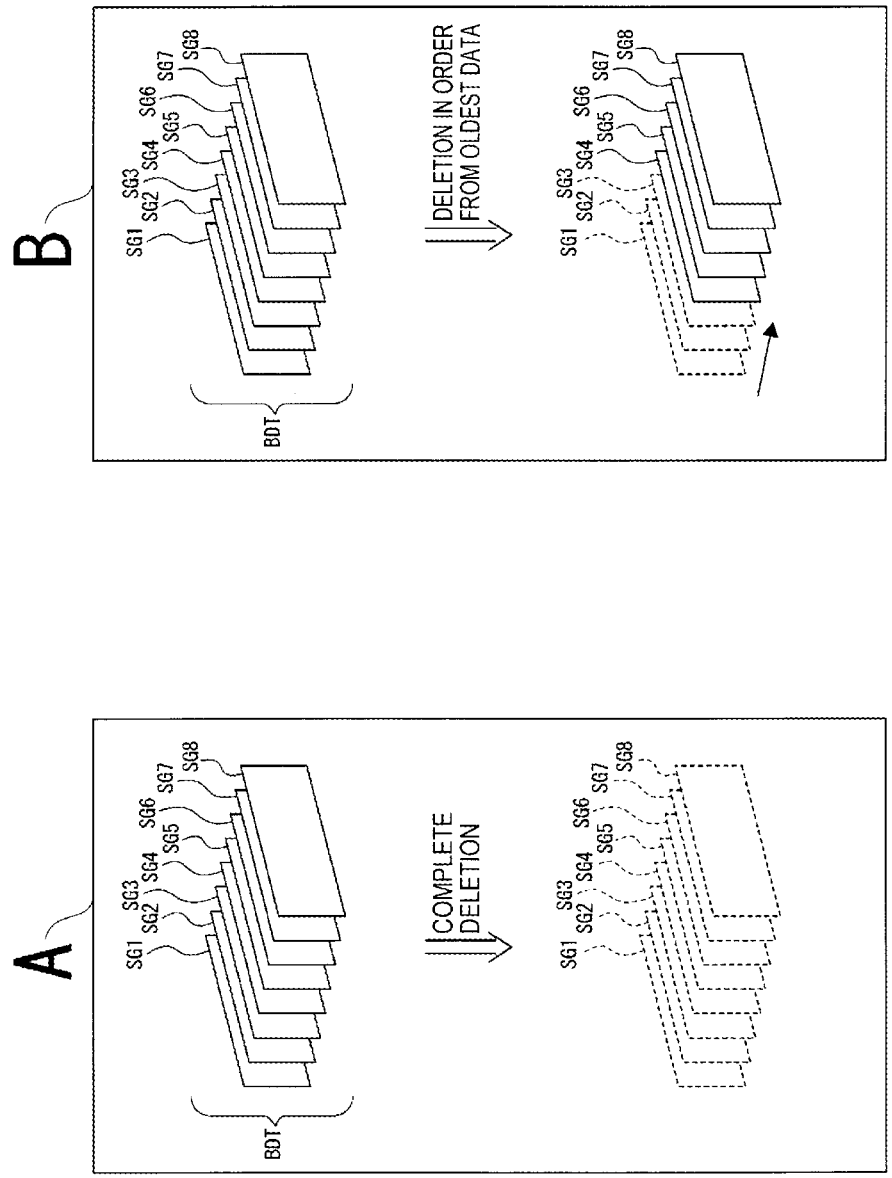
[Fig. 6]

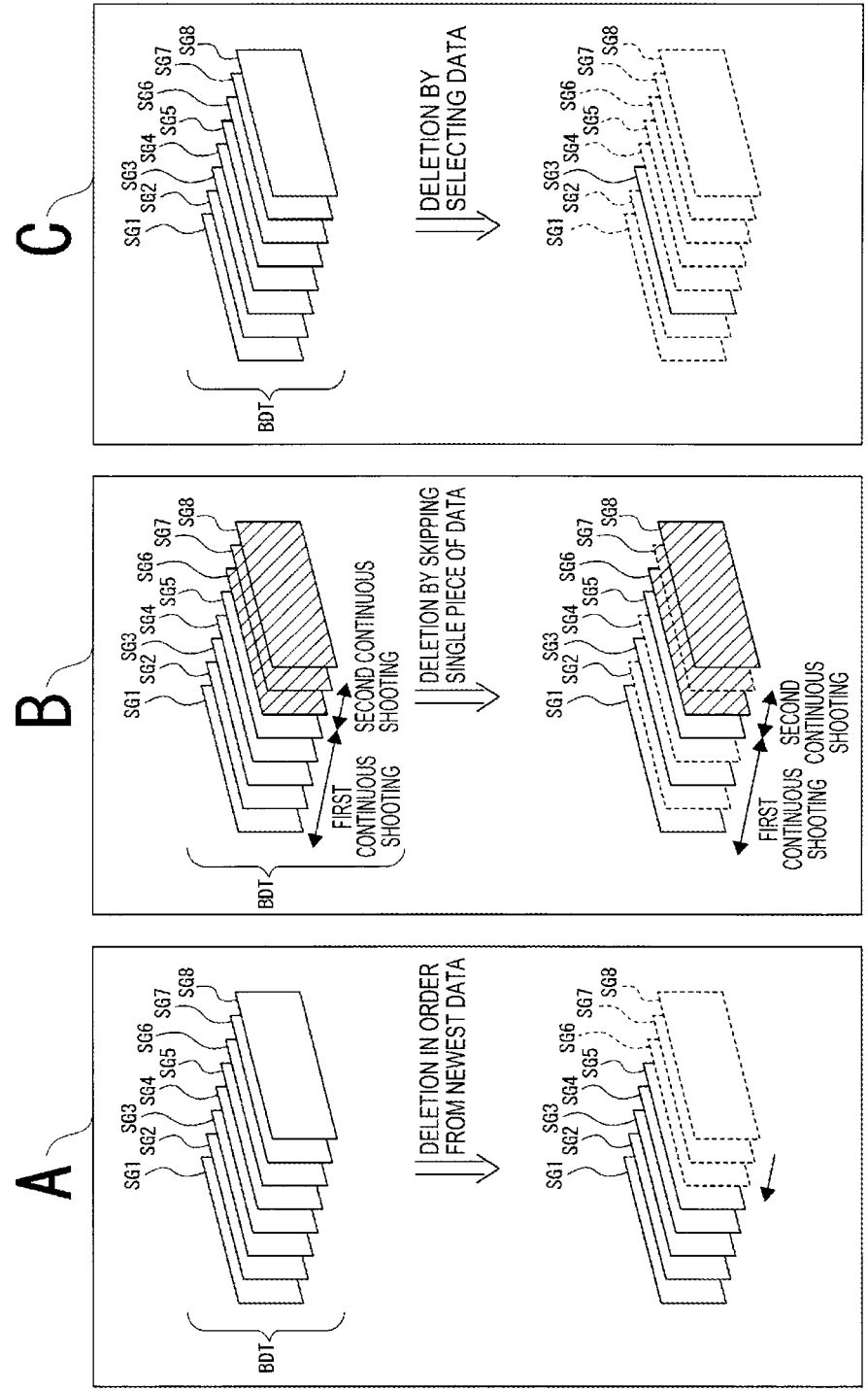

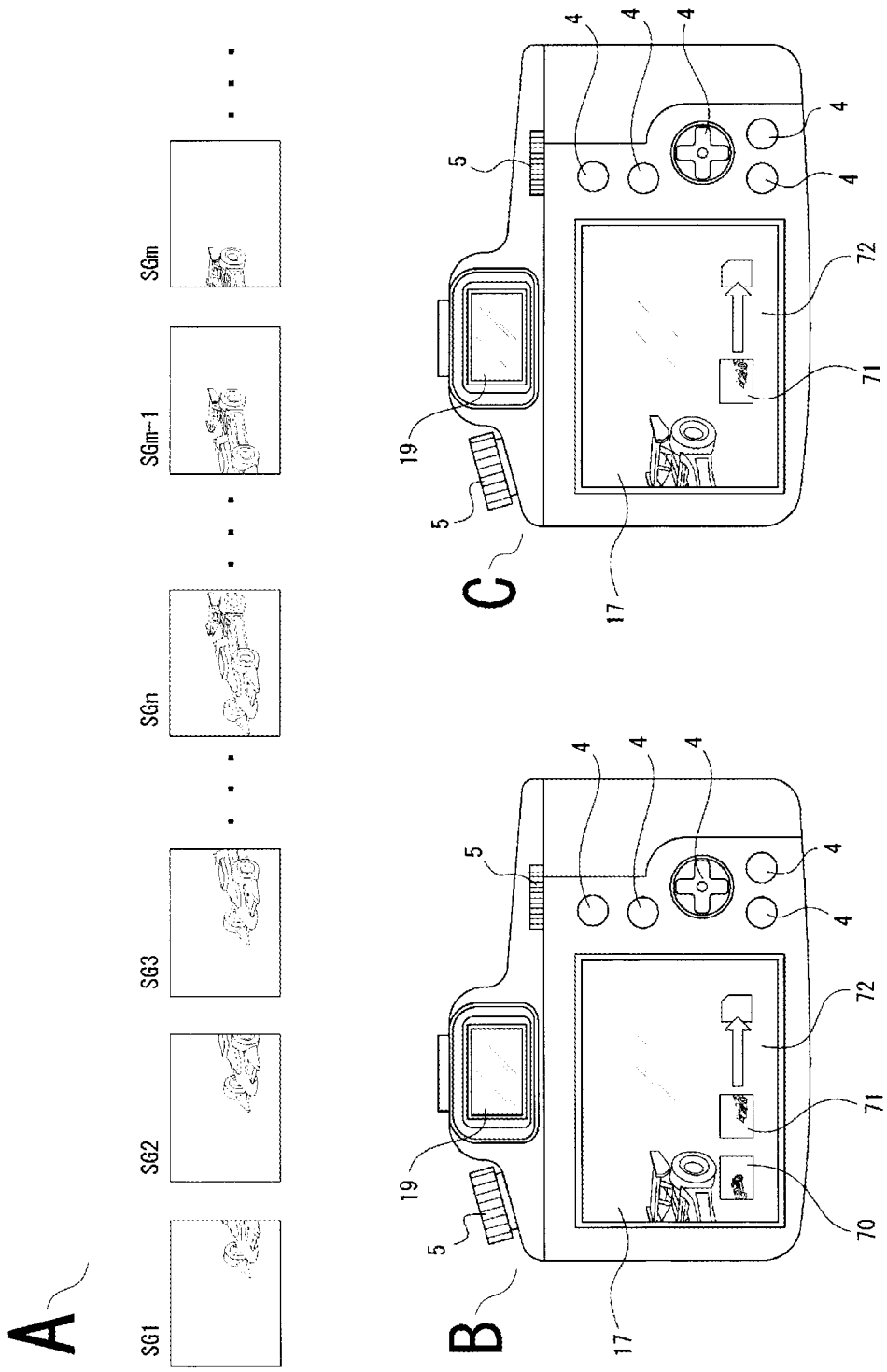
[Fig. 8]

[Fig. 9]
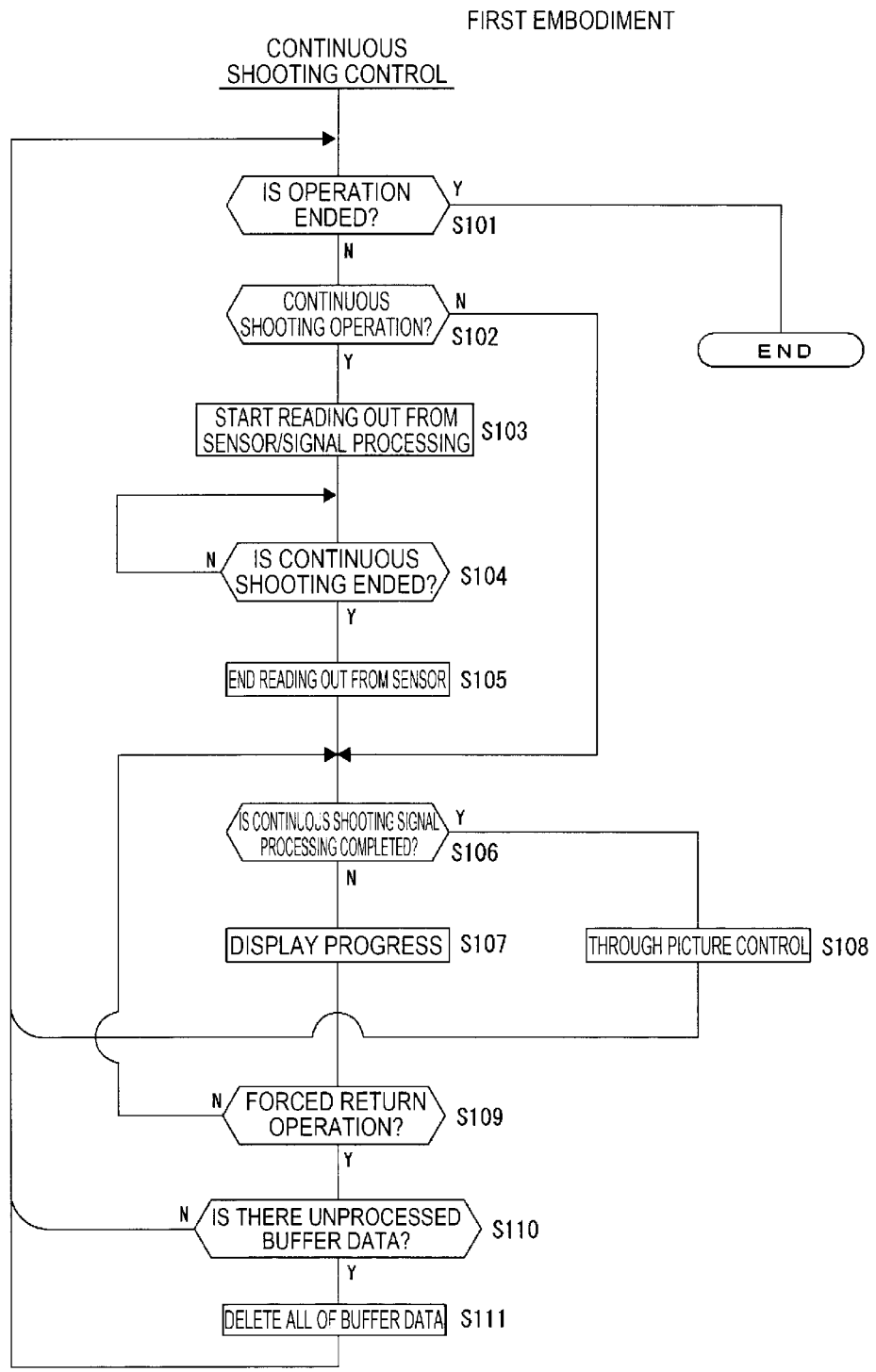

[Fig. 10]
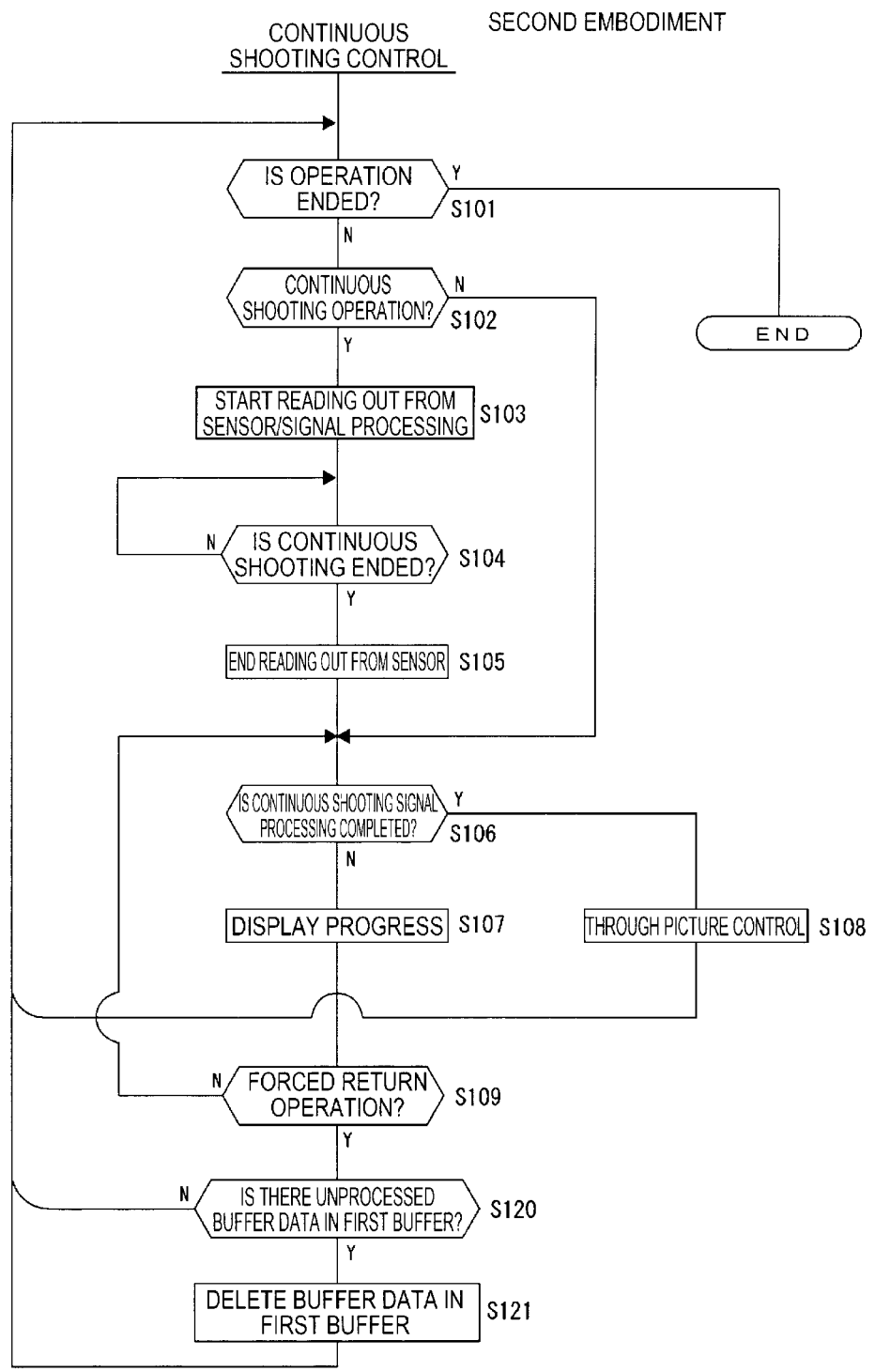

[Fig. 11]
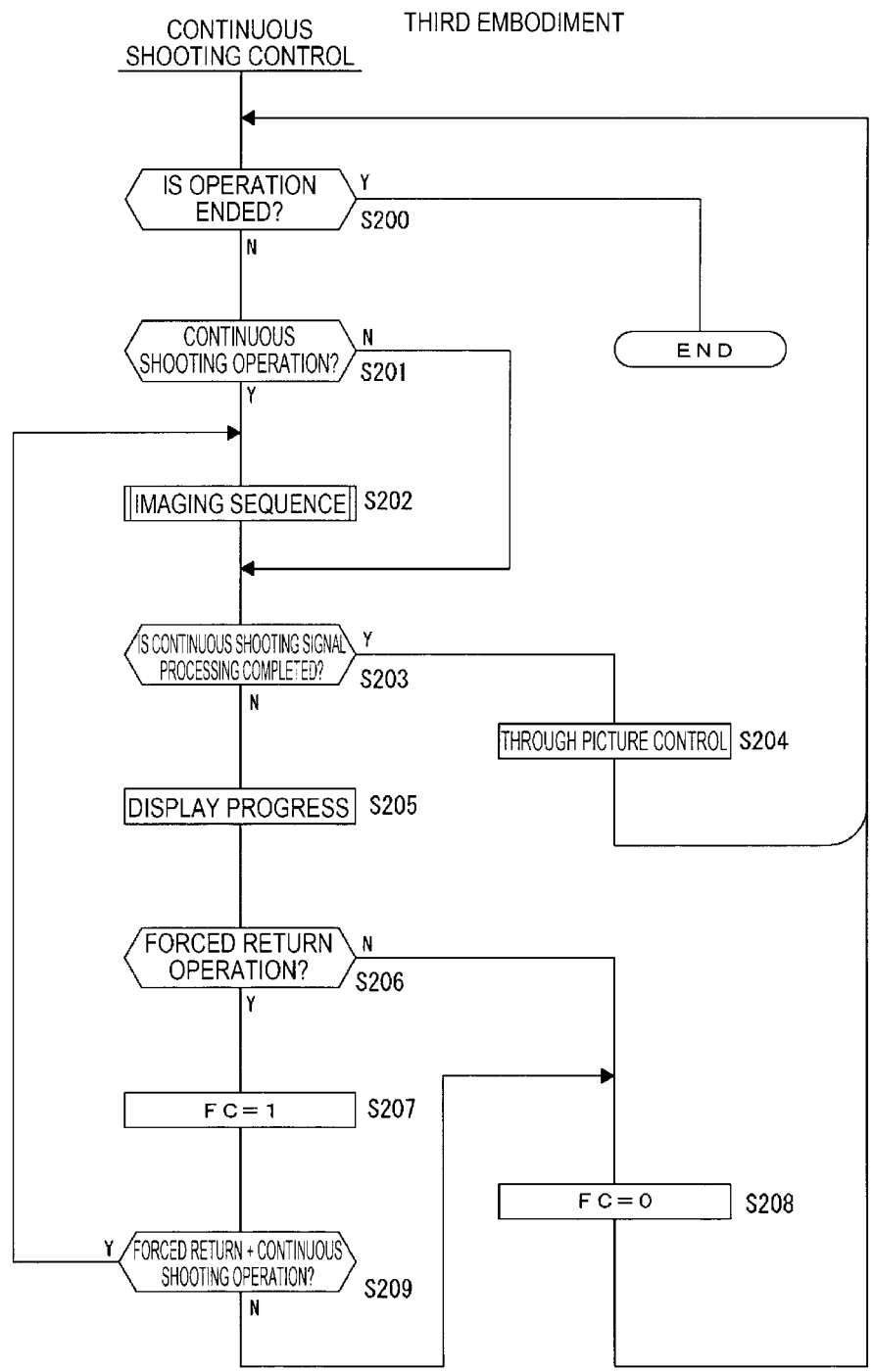

[Fig. 12]
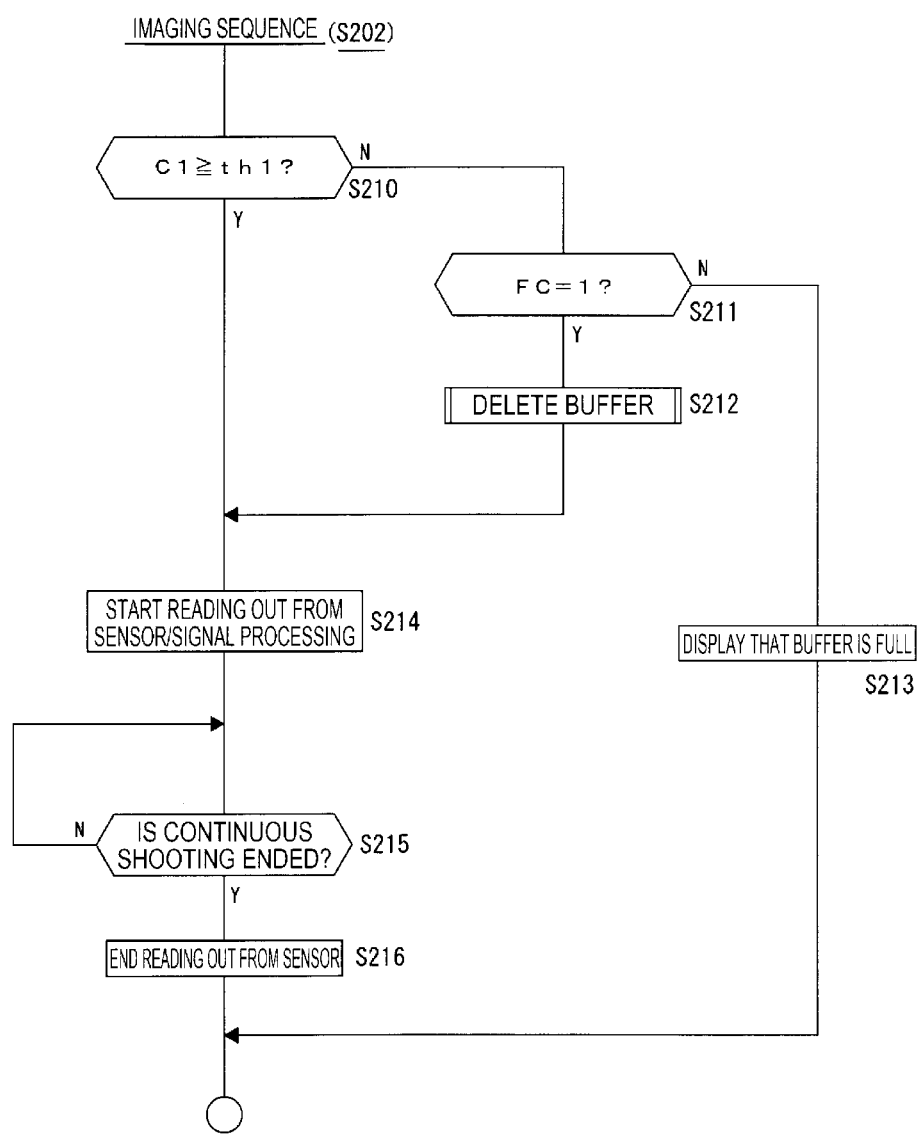

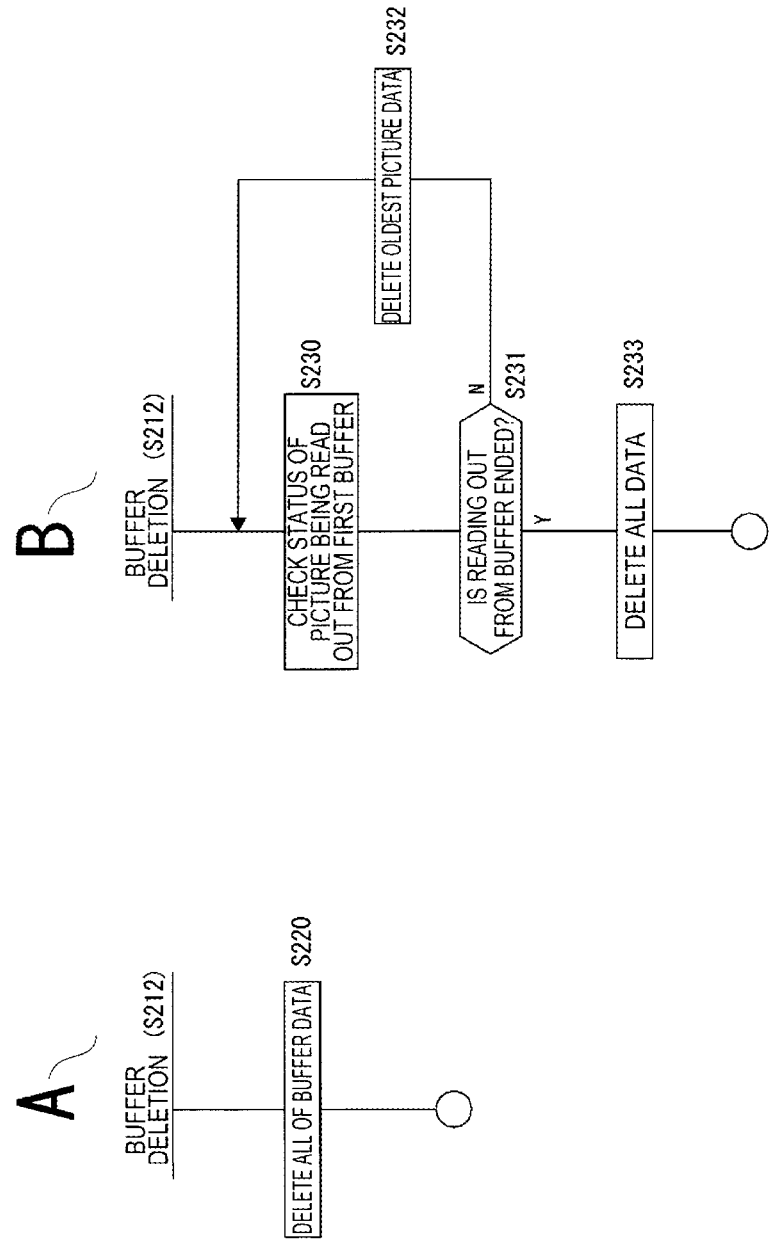
[Fig. 13]

[Fig. 14]
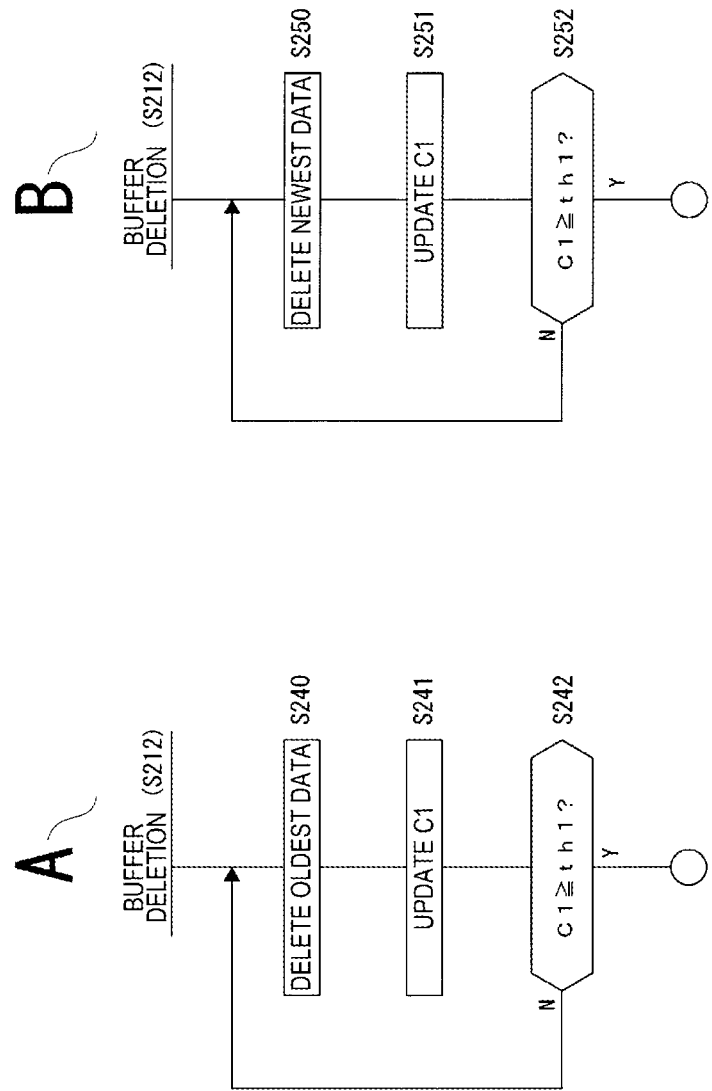

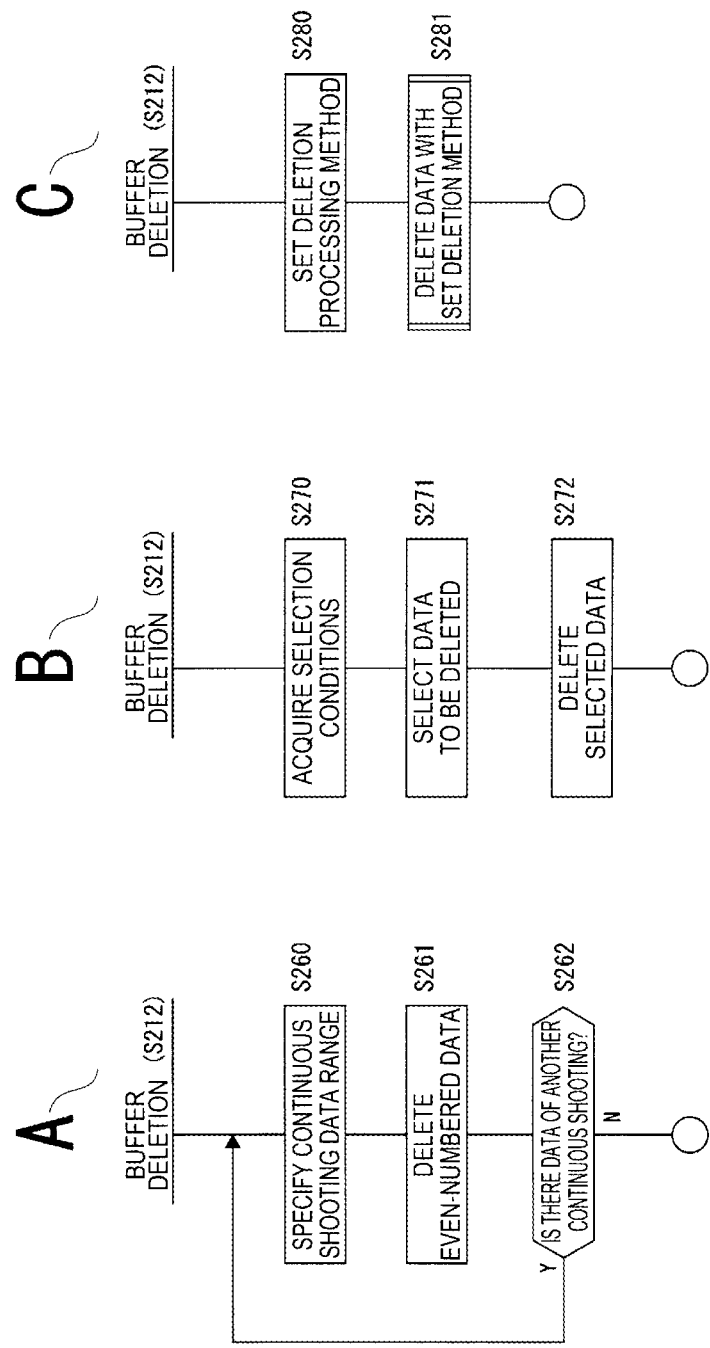
[Fig. 15]

IMAGING DEVICE, IMAGING METHOD

TECHNICAL FIELD

The present technique relates to an imaging device and an imaging method, and more particularly, to a technique for processing a series of picture data that is continuously acquired, such as continuous shooting of still pictures and moving picture imaging.

BACKGROUND ART

An imaging device having a function of continuously performing still picture imaging as so-called continuous shooting imaging is widely known. Particularly, in the case of an imaging device capable of high-precision picture imaging, it takes a relatively long time to complete writing of a large number of picture data obtained by continuous shooting on a recording medium. Because of this, in a signal processing unit in the imaging device, processing is progressed while a series of picture data is temporarily saved in a buffer memory.

Techniques related to an imaging device having a continuous shooting function is disclosed in PTL 1 and PTL 2. A technique in which imaged pictures obtained by continuous shooting is temporarily stored in a buffer memory for display such that pictures selected by a user are continuously saved in a recording medium and the remaining pictures are deleted is disclosed in PTL 1.

A technique in which a preliminary area is provided as a buffer memory used for continuous shooting and, according to circumstances, the preliminary area is used to deal with high-speed continuous shooting is disclosed in PTL 2.

CITATION LIST

Patent Literature

PTL 1: JP 2005-136855A
PTL 2: JP 2010-28451A

SUMMARY

Technical Problem

In a case in which a large number of picture data are continuously acquired by continuous shooting and signal processing is progressed while the acquired picture data is temporarily stored in a buffer memory, if signal processing of a subsequent stage is unable to catch up with a picture data acquisition interval of an imager (imaging element), the amount of storage in the buffer memory (the amount of picture data waiting for processing) is increased accordingly. Although, of course, due to the expansion of the buffer memory capacity, it is possible to make the buffer memory less likely to have full capacity, pressure of buffer memory capacity during continuous shooting progresses due to high precision of picture data, occurrence of advanced picture processing, high speed of continuous shooting, or the like.

Because of this, generally, signal processing up to saving of a series of picture data on a recording medium is often not completed immediately after a user has finished continuous shooting operation (for example, immediately after the user has finished release button operation of a camera), and thus the user is forced to wait for a while before the start of the next continuous shooting. However, this may cause an imaging opportunity to be missed out.

Therefore, in this technique, a technique that enables a user to start continuous shooting or the like immediately in a case in which the user considers that a more important imaging opportunity has occurred immediately after imaging operation such as continuous shooting is proposed.

Solution to Problem

According to an embodiment of the present technique, there is provided an imaging device including: a signal processing unit configured to cause a series of picture data being continuously acquired to be temporarily stored in a buffer memory area in a signal processing process, read out the series of picture data from the buffer memory area, and perform a subsequent signal processing; and a control unit configured to perform control for deleting at least a part of the picture data stored in the buffer memory area, on a basis of detecting a predetermined operation while the signal processing is being performed on the series of picture data by the signal processing unit.

In the signal processing unit, a process of reading out picture data from an image sensor, a process of developing picture data, a process of writing picture data on a recording medium, or the like is performed. In this case, even if picture data is read out from the image sensor at high speed by continuous shooting imaging or imaging/recording of a high frame rate moving picture (e.g., a super slow moving picture), by providing a buffer memory area, a process of developing each picture data, a process of writing each picture data, or the like may be sequentially performed. However, if the buffer memory area is full due to the delay of signal processing, it is necessary to wait until the next continuous shooting is possible. Therefore, picture data is forcibly deleted in the buffer memory area so that a storable capacity of the buffer memory area can be secured.

In the imaging device according to the embodiment of the present technique, the control unit may cause the deletion of the picture data stored in the buffer memory area to be executed in a case where a storable capacity of the buffer memory area is less than a predetermined amount.

Even in a case in which it is requested to delete picture data buffered in the buffer memory area by predetermined operation by the user, it is unnecessary to delete the picture data when the remaining capacity is sufficient to store the picture data. Therefore, actual picture data deletion is performed in a case in which the remaining capacity is less than a predetermined amount.

In the imaging device according to the embodiment of the present technique, the control unit may cause the deletion of the picture data stored in the buffer memory area to be executed in accordance with detecting an imaging starting operation for the series of picture data in addition to detecting the predetermined operation.

For example, the deletion control is not performed immediately by only detecting operation of a predetermined operating element, which is an instruction to delete picture data, and the deletion is executed in a case in which there is an imaging start operation of a series of picture data immediately afterwards.

In the imaging device according to the embodiment of the present technique, the control unit may cause the deletion of the picture data stored in the buffer memory area to be executed in accordance with only a condition of detecting the predetermined operation.

That is, deletion of picture data from the buffer memory area is executed impromptu in response to detection of a predetermined operation.

In the imaging device according to the embodiment of the present technique, a plurality of buffer memory areas in which the signal processing unit buffers picture data of different signal processing steps may be prepared, and in accordance with the predetermined operation, the control unit may cause the signal processing unit to execute complete or partial deletion of the picture data stored in the plurality of buffer memory areas.

In the signal processing unit, picture data is buffered for each of a plurality of steps in a signal processing process in some cases. The steps of the signal processing process are, for example, a step of performing a process of reading out picture data from an imaging element unit (imager), a step of performing a process of developing picture data, a step of performing a process of outputting picture data to a recording medium, and the like.

In that case, in accordance with the remaining capacity in the buffer memory area of each unit, waiting may be necessary until a restart such as continuous shooting immediately afterwards, in some cases. Therefore, buffer data deletion is performed for a plurality of buffer memory areas.

In the imaging device according to the embodiment of the present technique, a plurality of buffer memory areas in which the signal processing unit buffers picture data of different signal processing steps may be prepared, and in accordance with the predetermined operation, the control unit may cause the signal processing unit to execute complete or partial deletion of the picture data stored in a part of the buffer memory areas.

That is, in the case in which picture data is buffered for each of the plurality of steps in the signal processing process, buffer data deletion is performed for only some of the plurality of buffer memory areas.

In the imaging device according to the embodiment of the present technique, the part of the buffer memory areas may be a first buffer memory area that is used in a signal processing process in the signal processing unit.

In the case in which picture data is buffered for each of the plurality of steps in the signal processing process, buffer data deletion is performed in a buffer memory area in which buffer is performed initially.

In the imaging device according to the embodiment of the present technique, in a case where the control unit causes partial deletion of the picture data stored in the buffer memory area to be executed, the control unit may cause picture data whose imaging time is the oldest to be deleted first from among the picture data stored in the buffer memory area.

For example, a necessary amount of data is selected and deleted from picture data stored in a buffer memory area in order from the oldest imaging time.

In the imaging device according to the embodiment of the present technique, in a case where the control unit causes partial deletion of the picture data stored in the buffer memory area to be executed, the control unit may cause picture data whose imaging time is the newest to be deleted first from among the picture data stored in the buffer memory area.

For example, a necessary amount of data is selected and deleted from picture data stored in a buffer memory area in order from the newest imaging time.

In the imaging device according to the embodiment of the present technique, in a case where the control unit causes partial deletion of the picture data stored in the buffer memory area to be executed, the control unit may cause thinning deletion to be performed for a series of picture data in order of imaging time stored in the buffer memory area.

By thinning-deleting a series of picture data in order of imaging time stored in a buffer memory area, the capacity of the buffer memory area is secured.

In the imaging device according to the embodiment of the present technique, in a case where the control unit causes partial deletion of the picture data stored in the buffer memory area to be executed, the control unit may cause a picture to be deleted to be selected from among the picture data stored in the buffer memory area using a predetermined condition and be deleted.

From among pieces of picture data stored in a buffer memory area, picture data to be deleted is selected by setting conditions.

In the imaging device according to the embodiment of the present technique, in a case where the control unit causes deletion of the picture data stored in the buffer memory area to be executed, the control unit may cause the deletion of the picture data to be executed except for picture data being read out from the buffer memory area.

For picture data being read out for signal processing, signal processing is executed without change.

In the imaging device according to the embodiment of the present technique, in a case where the control unit causes deletion of the picture data stored in the buffer memory area to be executed, the control unit may cause the deletion of the picture data stored in the buffer memory area to be executed by selecting one of a plurality of deletion processing methods.

For example, as a deletion processing method, it is possible to select one of a plurality of deletion processing methods such as complete deletion, deletion in order from the oldest picture data, deletion in order from the newest picture data, thinning deletion, and deletion by selection under predetermined conditions.

In the imaging device according to the embodiment of the present technique, the control unit may perform control for a display indicating a progress of signal processing to be executed by a display unit during a period until signal processing for the series of picture data is completed by the signal processing unit.

For example, in a situation where signal processing is not completed yet for a while after the user has finished the imaging operation, a display indicating the progress of the signal processing is executed for the user.

In the imaging device according to the embodiment of the present technique, in the display indicating the progress, a picture on which processing for recording on a recording medium has been completed may be presented from among the series of picture data.

From among a series of picture data by continuous shooting imaging or super slow moving picture imaging, a picture on which processing for recording on a recording medium has been completed is presented.

In the imaging device according to the embodiment of the present technique, the series of picture data may be a plurality of pieces of still picture data input by a continuous shooting imaging operation.

In the case of continuous shooting imaging, a situation in which the capacity of a buffer memory area is pressed such that it is not possible to immediately shift to the next continuous shooting imaging or super slow moving picture imaging occurs. That is, in the case of performing continuous shooting imaging, data deletion in the buffer memory area is effective.

In the imaging device according to the embodiment of the present technique, the series of picture data may be picture data of a plurality of frames input by a moving picture imaging operation of a high frame rate switched from a normal imaging frame rate.

In the case of high frame rate moving picture imaging, a situation in which the capacity of a buffer memory area is pressed such that it is not possible to immediately shift to the next continuous shooting imaging or high frame rate moving picture imaging occurs. That is, in the case of performing high frame rate moving picture imaging, data deletion in the buffer memory area is effective. A high frame rate moving picture refers to, for example, a super slow moving picture.

In the imaging device according to the embodiment of the present technique, on a housing, an operating element for the predetermined operation may be provided in a state in which the operating element is unable to be operated simultaneously with an operating element for an imaging starting operation with one hand.

An operating element for instructing data deletion in a buffer memory area is arranged, for example, at a location spaced apart from an operating element for imaging starting operation so that the operating elements is unable to be operated simultaneously with one hand.

In addition, an operating element for the predetermined operation may be a button-type operating element. That is, it is assumed to be an operating element with simple operability.

According to an embodiment of the present technique, there is provided an imaging method of an imaging device including a signal processing unit configured to cause a series of picture data being continuously acquired to be temporarily stored in a buffer memory area in a signal processing process, read out the series of picture data from the buffer memory area, and perform a subsequent signal processing, the imaging method including: a procedure of detecting a predetermined operation while signal processing is being performed by the signal processing unit on a series of picture data obtained by an imaging operation; and a procedure of causing deletion of at least a part of the picture data stored in the buffer memory area to be executed on a basis of the detecting of the predetermined operation.

In this way, the storable capacity of a buffer memory area may be secured even immediately after continuous shooting.

Advantageous Effects of Invention

According to an embodiment of the present technique, because the capacity of a buffer memory can be secured in accordance with a user's intention even in a situation in which a large amount of buffer memory capacity is used due to continuous shooting or the like and thus it is not possible to start the next continuous shooting or the like, a state in which continuous shooting or the like is possible impromptu can be reached. In this way, a user can execute continuous shooting imaging or the like without missing out an imaging opportunity.

Note that the advantageous effects described herein are not necessarily limited, and may be any of the effects described in the present disclosure.

BRIEF DESCRIPTION OF DRAWINGS

FIG. 1 is an explanatory diagram of an exterior of an imaging device according to an embodiment of the present technique.

FIG. 2 is a block diagram of an imaging device according to an embodiment.

FIG. 3 is an explanatory diagram of an example of signal processing through a single buffer memory according to an embodiment.

FIG. 4 is an explanatory diagram of an example of signal processing through two buffer memories according to an embodiment.

FIG. 5 is an explanatory diagram of an example of signal processing through three buffer memories according to an embodiment.

FIG. 6 is an explanatory diagram of an example of picture data to be deleted according to an embodiment.

FIG. 7 is an explanatory diagram of an example of picture data to be deleted according to an embodiment.

FIG. 8 is an explanatory diagram of an elapsed picture according to an embodiment.

FIG. 9 is a flowchart of continuous shooting control according to a first embodiment.

FIG. 10 is a flowchart of continuous shooting control according to a second embodiment.

FIG. 11 is a flowchart of continuous shooting control according to a third embodiment.

FIG. 12 is a flowchart of an imaging sequence according to a third embodiment.

FIG. 13 is a flowchart of buffer deletion according to an embodiment.

FIG. 14 is a flowchart of buffer deletion according to an embodiment.

FIG. 15 is a flowchart of buffer deletion according to an embodiment.

DESCRIPTION OF EMBODIMENTS

Hereinafter, embodiments will be described in the following order.
<1. Configuration of imaging device>
<2. Examples of processing various signals by signal processing unit>
<3. Outline of buffer data deletion by forced return>
<4. Display of process progress>
<5. Structure for operation>
<6. Processing example>
6-1: First embodiment
6-2: Second embodiment
6-3: Third embodiment
<7. Application to super slow moving picture imaging>
<8. Summary and modifications>

Note that in description, "imaging" indicates an operation in which light from a subject is photoelectrically converted by an imaging element (an image sensor 12 which will be described below) and acquired as picture data constituting a still picture or a moving picture, in accordance with a release operation by a user or an automatic release operation.

Also, permanently recording imaged picture data in a recording medium such as a memory card through necessary signal processing is referred to as "recording."

In addition, a series of operations of acquiring (imaging) picture data of a subject and recording the picture data in a recording medium through signal processing will be referred to as "imaging recording."

1. Configuration of Imaging Device

A of FIG. 1 and B of FIG. 1 illustrate an example of an exterior of an imaging device 1 according to an embodiment. A of FIG. 1 is a perspective view as seen from the front side, and B of FIG. 1 is a rear view. Note that description will be given by assuming that a subject side is the front side (front side), and a side opposite a cameraman is the rear side (rear side).

The imaging device 1 is a so-called digital camera and is capable of imaging recording a still picture or a moving picture. Particularly, the imaging device 1 of the present embodiment is capable of continuous still picture imaging recording in which continuous shooting, i.e., continuous imaging of a plurality of still pictures, is performed and the imaged still pictures are recorded in a recording medium.

Continuously reading out picture data from the image sensor 12 during continuous shooting is referred to as "continuous shooting imaging" in some cases.

Also, the imaging device 1 of the present embodiment has a function of super slow moving picture imaging recording for performing high frame rate imaging in some cases. The super slow moving picture imaging recording refers to an operation in which picture data read out from an image sensor at a very high speed is temporarily stored in a buffer memory, and the picture data is developed at normal speed to create a slow motion moving picture and record the created slow motion moving picture in a recording medium The operation of reading out picture data from the image sensor 12 as a process of the super slow moving picture imaging recording is referred to as "super slow moving picture imaging" in some cases.

As illustrated in A of FIG. 1, a lens barrel 8 incorporating a lens optical system is provided at a front side of the imaging device 1, and a grip portion 9 is formed for a user to easily hold the lens barrel 8 with right hand with the lens barrel 8 facing a subject.

A release button 2 is arranged at an upper side of the grip portion 9. The arrangement of the release button 2 is set at a position where the user can easily operate the release button 2 with the index finger or the like with the right hand gripping the grip portion 9.

A forced return button 3 is provided at a position on a main body behind the lens barrel 8. The forced return button 3 is an operating element operated by the user to forcibly return to a state in which continuous shooting or super slow moving picture imaging is possible. A processing operation according to the operation of the forced return button 3 will be described below.

As illustrated in B of FIG. 1, various operating elements as an operation button 4 or an operation dial 5 are provided at a rear side or an upper surface of the imaging device 1. With such operating elements, various operations such as a zoom operation, a mode setting operation, a function selection operation, a menu operation, an item selection operation, and a reproduction related operation are made possible.

In addition, a display unit 17 and an electronic viewfinder 19 are provided for the user to check a through picture (a monitoring picture during recording standby), an imaged recorded picture, a reproduced picture, or the like.

Note that, for example, a touch panel may be arranged on the display unit 17 so that a touch operation is possible.

FIG. 2 illustrates an internal configuration example of the imaging device 1.

As illustrated in FIG. 2, the imaging device 1 includes an optical system 11, an image sensor 12, an optical system drive unit 13, a sensor unit 14, a recording unit 15, a communication unit 16, a display unit 17, an operation unit 18, an electronic viewfinder 19, a signal processing unit 20, and a control unit 30.

The optical system 11 includes a cover lens, a focus lens, a zoom lens, a condenser lens, a diaphragm mechanism, and the like. By the optical system 11, light from a subject is condensed on the image sensor 12.

The image sensor 12 has, for example, an imaging element such as a charge-coupled device (DDC) type imaging element and a complementary metal oxide semiconductor (CMOS) type imaging element, and a peripheral circuit system configured to read out a charge from the imaging element.

A signal read out from the image sensor 12 is supplied to the signal processing unit 20 as an imaged picture signal of a subject.

A signal transmission operation and an electronic shutter speed in the image sensor 12 are controlled by the control unit 30.

The optical system drive unit 13 drives the focus lens in the optical system 11 on the basis of control of the control unit 30 and executes a focusing operation. Also, the optical system drive unit 13 drives the diaphragm mechanism in the optical system 11 on the basis of control of the control unit 30 to execute exposure adjustment or drives the zoom lens to execute the zoom operation.

The signal processing unit 20 is configured as a picture processing processor by, for example, a digital signal processor (DSP) or the like. The signal processing unit 20 performs various signal processing on a digital signal (imaged picture signal) from the image sensor 12.

For example, the signal processing unit 20 performs a correlated double sampling (CDS) process, an automatic gain control (AGC) process, or the like on an electrical signal obtained by photoelectric conversion in the image sensor 12 and further performs an analog/digital (A/D) conversion process.

The signal processing unit 20 performs various processes while successively buffering imaged signals (picture data) converted into digital data. For example, the signal processing unit 20 performs a noise removal process, a Y/C process, a color correction process, an edge enhancement process, a resolution conversion process, a codec process as recording formatting, data pressing, and the like on the picture data.

Note that in some cases, the image sensor 12 performs a process up to an A/D converter, and the signal processing unit 20 receives an imaged signal (picture data) converted into digital data.

The recording unit 15 stores picture data as a still picture or a moving picture generated by the signal processing unit 20 in a recording medium 15a, on the basis of control of the control unit 30. The recording medium 15a indicates a recording medium that records picture data permanently (instead of temporarily).

The recording medium 15a may be detachable like a memory card, an optical disc, a magnetic tape or the like, or may be fixed like a hard disk drive (HDD), a semiconductor memory module, or the like.

The communication unit 16 performs wired or wireless communication with an external device (not illustrated), on the basis of control of the control unit 30. That is, the communication unit 16 performs transmission of imaged picture data, picture data read out from the recording medium 15a, additional information of such pieces of picture data, and other control data to an external device or receives various data from the external device.

In this way, the imaging device 1 outputs picture data or the like to the external device (not illustrated) for the imaged picture data to be reproduced or edited in the external device.

As wireless communication, it is conceivable that the communication unit 16 performs communication by a communication system such as a wireless communication standard such as Wi-Fi (registered trademark) or Bluetooth (registered trademark).

Also, the communication unit 16 may perform wired communication using a connector cable such as a Universal Serial Bus (USB) cable or the like. The communication unit 16 may also perform communication by various networks such as the Internet, a home network, a local area network (LAN) or the like and perform transmission and reception of various pieces of data to and from a server, a terminal, or the like on the network.

The operation unit 18 comprehensively shows an input function for inputting a user's operation. That is, operating elements such as the above-described release button 2, forced return button 3, operation button 4, operational dial 5, and the like are collectively shown as the operation unit 18. Further, even in a case in which other operation input units such as a touch panel or a reception unit of a remote controller are provided, these are also one mode of the operation unit 18.

Operation information obtained by the operation unit 18 is supplied to the control unit 30. The control unit 30 performs necessary control in accordance with the operation information.

The display unit 17 is a display unit configured to perform various displays to the user, and for example, as illustrated in B of FIG. 1, the display unit 17 is formed with a display device such as a liquid crystal display (LCD) or an organic electro-luminescence (EL) display formed on a housing of the imaging device 1.

The electronic viewfinder 19 is also formed using an LCD, an organic EL display, or the like, and performs complementary presentation of pictures or information to the user with the display unit 17.

Picture data of an imaged picture whose resolution has been converted for display is supplied from the signal processing unit 20 to the display unit 17 or the electronic viewfinder 19. The display unit 17 or the electronic viewfinder 19 displays the picture data of the imaged picture. In this way, the user can check a so-called through picture (a monitoring picture of a subject).

Also, picture data reproduced in the recording unit 15 may be supplied to the display unit 17 or the electronic viewfinder 19 via the signal processing unit 20, and by the picture data being displayed, the user can check a reproduced picture of an imaged recorded picture.

The display unit 17 or the electronic viewfinder 19 also causes display of various operation menus, icons, messages, etc. i.e., graphical user interface (GUI), on a screen on the basis of an instruction of the control unit 30.

Note that an optical finder is provided instead of the electronic viewfinder 19 in the imaging device 1 in some cases. For example, the imaging device 1 is a so-called single lens reflex camera in some cases.

The sensor unit 14 comprehensively shows various sensors. Specifically, a gyro sensor for detecting the attitude of the imaging device 1 or, for example, a camera shake, an acceleration sensor for detecting movement acceleration and gravidity direction of the imaging device 1, and the like are provided in some cases. As the sensor unit 14, an illuminance sensor for detecting external illuminance for exposure adjustment or the like, a distance measuring sensor for measuring a subject distance, and the like may be provided.

The various sensors of the sensor unit 14 transmit detection signals to the control unit 30. The control unit 30 can perform various controls using information detected by the sensor unit 14.

The control unit 30 is configured, for example, by a microcomputer (arithmetic processing device) including a central processing unit (CPU), a read-only memory (ROM), a random access memory (RAM), a flash memory, and the like.

The CPU executes a program stored in the ROM, the flash memory, or the like thereby totally controlling the entire imaging device 1.

The RAM is used as a work area during various data processing of the CPU and is used for temporarily storing data, programs, and the like.

The ROM or the flash memory (nonvolatile memory) is used for storing application programs for various operations, firmware, and the like as well as an operating system (OS) for the CPU to control each part and a content file such as a picture file.

The control unit 30 controls operation of each unit, such as instructions of various signal processing in the signal processing unit 20, an imaging operation according to user operation, a storage reproduction operation in the recording unit 15, a camera operation such as focusing/exposure adjustment, an exposure/reading-out operation of the image sensor 12, a communication operation with an external device by the communication unit 16, and a display operation in the display unit 17 or the electronic viewfinder 19.

Note that the signal processing unit 20 and the control unit 30 may be integrated as a one-chip microcomputer or the like.

In the description of the embodiment, although it is assumed that the control unit 30 corresponds to the "control unit" mentioned in the claims, for example, the DSP functioning as the signal processing unit 20 or the CPU in the microcomputer may also be assumed as corresponding to the "control unit" mentioned in the claims.

2. Examples of Processing Various Signals by Signal Processing Unit

Examples of signal processing in the signal processing unit 20 will be described with reference to FIGS. 3, 4, and 5. FIGS. 3, 4, and 5 mainly show processing processes in the signal processing unit 20 in the configuration of FIG. 2.

First, an example of FIG. 3 will be described.

A first processing unit 41 and a second processing unit 42 show arithmetic processing at each step executed in the signal processing unit 20 formed by a DSP, a microcomputer, or the like. Here, the first processing unit 41 and the second processing unit 42 do not refer to separate units as hardware, and show a signal processing process. However, the first processing unit 41 and the second processing unit 42 may also be configured as separate units as hardware.

The same applies to a third processing unit 43 and a fourth processing unit 44 of FIGS. 4 and 5, which will be described below.

In the case of an example of FIG. 3, the signal processing unit 20 performs signal processing by the first processing unit 41 on a signal supplied from the image sensor 12, and buffers (temporarily stores) the signal in a buffer memory area 51.

Note that the buffer memory area 51 is a buffer for buffering a difference in processing speeds of the first processing unit 41 and the second processing unit 42, which process each step in the signal processing unit 20. Hereinafter, such a buffer memory area for the purpose of buffering in the signal processing unit 20 is also simply referred to as a "buffer."

Also, in consideration of an example which will be described below, as a storage area of an initial buffering step in the signal processing unit 20 for buffering the processing speed difference is referred to as a "first buffer 51," storage areas will be indicated by sequentially attaching "first," "second," etc. thereto.

The picture data buffered in the buffer memory area is generally referred to as "buffer data BDT," and the picture data of the first buffer 51 is referred to as, for example, "buffer data BDT1."

As these buffer memory areas, for example, a storage area inside a chip as a DSP or a microcomputer functioning as the signal processing unit 20 may be used, or a storage area of a memory element outside the chip may be used.

Of course, one or a plurality of buffer memory areas such as the first buffer 51 may be fixedly determined as the address range of the RAM, or may be one to which the address range is variably assigned.

The picture data (buffer data BDT1) temporarily stored in the first buffer 51 is sequentially read out in accordance with the processing timing of the second processing unit 42, and signal processing is performed thereon by the second processing unit 42. The picture data processed in the second processing unit 42 is transmitted to the recording unit 15 and recorded in the recording medium 15a as still picture data CS or moving picture data MV. The still picture data CS is, for example, a normal one-shot imaged still picture or a plurality of a series of still picture data obtained by continuous shooting. The moving picture data MV is moving picture data obtained by normal moving picture imaging recording or moving picture data as a super slow motion moving picture.

The control unit 30 performs an instruction related to signal processing of the first processing unit 41 and the second processing unit 42 or control related to erasing of the buffer data BDT of the first buffer 51 in accordance with operation information from the operation unit 18 or operation programs.

Next, an example of FIG. 4 will be described. In this case, a first buffer 51 and a second buffer 52 are used to buffer the processing speed difference in the signal processing unit 20.

In the signal processing unit 20, signal processing is performed on a signal supplied from the image sensor 12 by the first processing unit 41, and the processed signal is temporarily stored in the first buffer 51.

The buffer data BDT1 temporarily stored in the first buffer 51 is sequentially read out in accordance with the processing timing of the second processing unit 42, subjected to signal processing by the second processing unit 42, and then temporarily stored in the second buffer 52.

Buffer data BDT2 temporarily stored in the second buffer 52 is sequentially read out in accordance with the processing timing of the third processing unit 43. Then, picture data processed by the third processing unit 43 is transmitted to the recording unit 15 and recorded on the recording medium 15a as the still picture data CS or the moving picture data MV.

The control unit 30 performs an instruction related to signal processing of the first processing unit 41, the second processing unit 42, and the third processing unit 43, or control related to erasing of the buffer data BDT of the first buffer 51 and the second buffer 52.

Although a RAM or the like inside and outside a chip constituting the signal processing unit 20 is used as the first buffer 51 and the second buffer 52, a common RAM may be used or separate RAMs may be used for the first buffer 51 and the second buffer 52.

Next, an example of FIG. 5 will be described. In this case, a first buffer 51, a second buffer 52, and a third buffer 53 are used to buffer the processing speed difference in the signal processing unit 20.

The signal processing unit 20 performs signal processing on a signal supplied from the image sensor 12 by the first processing unit 41 and temporarily stores the processed signal in the first buffer 51.

The buffer data BDT1 temporarily stored in the first buffer 51 is sequentially read out in accordance with the processing timing of the second processing unit 42, subjected to signal processing by the second processing unit 42, and then temporarily stored in the second buffer 52.

The buffer data BDT2 temporarily stored in the second buffer 52 is sequentially read out in accordance with the processing timing of the third processing unit 43, subjected to signal processing by the third processing unit 43, and then temporarily stored in the third buffer 53.

Buffer data BDT3 temporarily stored in the third buffer 53 is sequentially read out in accordance with the processing timing of a fourth processing unit 44. Then, picture data processed by the fourth processing unit 44 is transmitted to the recording unit 15 and recorded on the recording medium 15a as the still picture data CS or the moving picture data MV.

The control unit 30 performs an instruction related to signal processing of the first processing unit 41, the second processing unit 42, the third processing unit 43, and the fourth processing unit 44 or control related to erasing of the buffer data BDT of the first buffer 51, the second buffer 52, and the third buffer 53.

Although a RAM or the like inside and outside a chip constituting the signal processing unit 20 is used as the first buffer 51, the second buffer 52, and the third buffer 53, a common RAM may be used or separate RAMs may be used for the first buffer 51, the second buffer 52, and the third buffer 53.

Although three examples are shown above, cases in which there are more processing steps and more buffering steps may also be assumed. Those are designed according to processing content, functions, and the like in the signal processing unit 20.

In the following description on operation of the present embodiment, the example of FIG. 4 will be used.

Specific examples of the first processing unit 41, the second processing unit 42, the third processing unit 43, and the fourth processing unit 44 that perform an exchange of picture data through buffering as shown in FIGS. 3, 4, and 5 are not limited, and although those are determined according to various processing contents or processing speeds, in the case of FIG. 4, the following processing classification may be considered as an example.

The processing of the first processing unit 41 is referred to as "read-out processing."

That is, the processing includes reading out a photoelectrically-converted signal from the image sensor 12, converting the read-out signal into digital data, and generating picture data as a raw picture. As the buffer data BDT1 of the first buffer 51, raw picture data is assumed.

The processing of the second processing unit 42 is referred to as "development processing." That is, processing in which necessary signal processing such as a noise removal process, a Y/C process, a color correction process, an edge enhancement process, a resolution conversion process, and the like are performed on raw picture data to generate developed picture data is assumed.

As the buffer data BDT2 of the second buffer 52, picture data after development is assumed.

Note that processes of recording formatting and pressing (for example, JPEG codec and the like) of picture data are included in the processing of the second processing unit 42 in some cases. In that case, the buffer data BDT2 of the second buffer 52 is, for example, JPEG picture data or the like.

The processing of the third processing unit 43 is referred to as "media output processing." That is, the processing is a process of transmitting and outputting picture data for recording on the recording unit 15. The processing also includes a process of writing on the recording medium 15a in some cases. The processing also includes a process of recording formatting and pressing (for example, JPEG codec and the like) of picture data in some cases.

3. Outline of Buffer Data Deletion by Forced Return

A forced return to a state in which continuous shooting is possible according to the present embodiment will be described in accordance with the above examples.

For example, considering the signal processing examples as shown in FIGS. 3, 4, and 5, the processing speed difference at each step is buffered by buffering, and thus, for example, an advantage in that high-speed continuous shooting is possible can be obtained.

That is, in the example of FIG. 4, by sequentially performing the development processing in the second processing unit 42 while storing picture data read out from the image sensor 12 in the first buffer 51, picture data can be read out from the image sensor 12 more rapidly than a speed at which the development processing is performed. This allows the continuous shooting speed to be improved without being limited by the development processing speed.

However, since a read-out processing speed is generally faster than a development processing speed, even when the development processing is executed in parallel with the read-out processing, the first buffer 51 becomes full at some point, and the first processing unit 41 is unable to perform further read-out processing.

In that case, the next reading-out is unable to be performed until the development of the buffer data BDT1 is completed in the second processing unit 42, and since it is only necessary to read out at a slow speed at the expense of the original reading-out speed, the imaging interval is extended, and continuous shooting at the maximum speed is unable to be performed.

The buffer data BDT1 of the first buffer 51 is subjected to development processing by the second processing unit 42, temporarily stored in the second buffer 52, read out by the third processing unit 43, and written on the recording medium 15a.

In this way, since the development processing can be performed through the second buffer 52 regardless of performance of the media output processing, the time until the first buffer 51 becomes full can be extended.

However, in a case in which the development processing speed is faster than the media output processing speed, the second buffer 52 becomes full at some point, and it is forced to wait for the development processing.

As a result, the buffer data BDT1 is unable to be developed on the first buffer 51-side and is accumulated, and finally, since the first processing unit 41 is unable to read out data from the image sensor 12, continuous shooting at the maximum speed is unable to be performed.

In this way, even in the case in which the development processing speed and the media output processing speed are slower than the read-out processing speed from the image sensor 12, by providing the buffer memory areas (51, 52, and the like), continuous shooting at the maximum speed, which is equal to the read-out speed, is sustainable for a predetermined amount of time. However, in the case in which the buffer is full beyond the amount of time in which continuous shooting is sustainable, the continuous shooting speed is limited by the speed of processing that is a bottleneck, and a state in which continuous shooting at the maximum speed is unable to be performed is reached.

This means that, for example, when performing continuous shooting for several seconds, it takes a certain amount of time to complete recording of a series of picture data obtained by continuous shooting on the recording medium 15a. Then, immediately after continuous shooting, the user has to wait until continuous shooting at the maximum speed (or continuous shooting itself) becomes possible. The user may encounter a scene that he or she wants to image even during this standby time in some cases. However, in that case, if the user has only to wait until imaging becomes possible, the user loses an imaging opportunity.

In view of such circumstances, in the present embodiment, it is possible to perform continuous shooting (continuous shooting itself or continuous shooting at the maximum speed) impromptu in accordance with the user's intention.

Specifically, a structure for forcibly deleting buffer data BDT is prepared, the picture data before the completion of the recording is deleted by the user's intention, and the buffer memory area is freed to return to continuous shooting.

That is, returning to continuous shooting is possible in response to a case in which the user wants to take a picture of the current scene even if the user has to discard a picture taken immediately before.

Therefore, the forced return button 3 is provided as illustrated in FIG. 1. Although the mode and the structure of the operating element are not limited to the button type, here, it is assumed that the operating element is an operation button.

When the user instructs a forced return to the state in which continuous shooting is possible by the forced return button 3, the control unit 30 instructs buffer memory areas of the first buffer 51 and the second buffer 52 to be forcibly open upon receiving the operation information.

Although various buffer freeing methods can be considered, the simplest way is to simply delete (erase) all of unprocessed data in a buffer.

The upper part of A of FIG. 6 shows a state in which pieces of picture data SG1 to SG8 are temporarily stored as the buffer data BDT. For example, it is assumed that the buffer memory area is full due to the pieces of picture data SG1 to SG8. Of course, the number of pieces of picture data being 8 is merely a simplified example for the sake of description.

All of the pieces of picture data are deleted as shown in the lower part of the same drawing (broken lines indicate that the pieces of data are deleted). As a result, the buffer memory area is open, and new buffering is possible.

Note that various buffers can be considered as buffers to be subjected to deletion of buffer data BDT.

For example, complete deletion of the pieces of buffer data BDT1 and BDT2 may be performed for both the first buffer 51 and the second buffer 52 in the case of FIG. 4.

Alternatively, complete deletion of the buffer data BDT1 may be performed for only the first buffer 51, or complete deletion of the buffer data BDT2 may be performed for only the second buffer 52.

The user may set buffers to be subjected to deletion or whether all buffers or some of the buffers will be subjected to deletion.

Note that in the case of FIG. 5 as well, whether all buffers or some of the buffers will be subjected to deletion may be considered.

Even in a case in which partial deletion, instead of complete deletion, are subjected to deletion, which will be described below, buffers to be subjected to deletion may be considered in various ways.

For example, by deleting the buffer data BDT as shown in A of FIG. 6, the buffer is emptied instead of giving up picture data that is imaged and unrecorded, so that it is possible to give the user an opportunity for continuous shooting imaging.

Regarding the deletion of the buffer data BDT, it may be partial deletion rather than complete deletion as described above.

The complete deletion allows the user to easily understand a situation of the imaging device 1 and is suitable for starting continuous shooting with the highest performance, but by the partial deletion, an appropriate deletion method that is likely to leave valuable pictures may be provided to the user.

In that sense, it is also desirable to allow the user to select whether to perform the complete deletion or partial deletion which will be described below, and further, a deletion method with which deletion is to be performed.

An example of partial deletion of buffer data BDT in a certain buffer memory area is illustrated in B of FIG. 6 and FIG. 7.

First, B of FIG. 6 shows an example in which deletion is performed in order from the oldest data. For example, the upper part of B of FIG. 6 shows a state in which pieces of picture data SG1 to SG8 are temporarily stored in that order as the buffer data BDT. As shown in the lower part of the same drawing, the pieces of picture data are deleted in order from the oldest picture data, for example, the pieces of picture data SG1, SG2, and SG3 are deleted in that order (shown with broken lines). In accordance with the processing order of the signal processing unit 20, picture data that has been already provided to signal processing of a subsequent stage may remain in a buffer memory area in some cases. In such a case, since deleting in order from the oldest data does not necessarily discard the pictures, it is preferable from the viewpoint that discarding pictures taken is avoided as much as possible.

Although the pieces of picture data SG4 to SG8 still remain in the buffer memory area, buffering corresponding to new continuous shooting is possible by securing a storable capacity of a predetermined amount of more.

Accordingly, it is conceivable that the number of pieces of picture data to be deleted in order from the oldest one is determined in accordance with, for example, the time until a storable capacity of a predetermined amount or more can be secured in the buffer memory area.

A of FIG. 7 illustrates an example of deleting in order from the newest data. For example, the upper part of A of FIG. 7 shows a state in which pieces of picture data SG1 to SG8 are temporarily stored in that order as the buffer data BDT. As shown in the lower part of the same drawing, the pieces of picture data are deleted in order from the newest picture data, for example, the pieces of picture data SG8, SG7, and SG6 are deleted in that order (shown with broken lines).

Although the pieces of picture data SG1 to SG5 still remain in the buffer memory area, new buffering is possible by securing a storable capacity. The number of pieces of picture data to be deleted in order from the newest one is determined in accordance with, for example, the time until a storable capacity of a predetermined amount or more can be secured in the buffer memory area.

The new data is a picture just before the end of continuous shooting, and for the user, there is a possibility that the new data is a picture after finishing taking the best scene (a situation in which the user attempts to end continuous shooting). Therefore, it is conceivable that the user often has a small feeling of resistance for deletion of a new picture.

B of FIG. 7 illustrates an example in which, among a series of picture data taken by continuous shooting, thinning deletion is performed by, for example, for every other piece of picture data.

For example, the upper part of A of FIG. 7 illustrates a state in which a series of picture data SG1 to SG5 taken by a first continuous shooting and a pieces of picture data SG6 to SG8 (hatched) taken by a second continuous shooting are temporarily stored as the buffer data BDT.

As shown in the lower part of the same drawing, thinning deletion is performed from each series of picture data (shown with broken lines). That is, from among the series of picture data SG1 to SG5 taken by the first continuous shooting, the pieces of picture data SG2 and SG4 are deleted. Also, from among the pieces of picture data SG6 to SG8 taken by the second continuous shooting, the picture data SG7 is deleted.

Although the pieces of picture data SG1, SG3, SG5, SG6, and SG8 still remain in the buffer memory area, new buffering is possible by securing a storable capacity.

Selection of a series of picture data to be thinned or an interval thereof (skipping a single piece of picture data, skipping two pieces of picture data, etc.) may be considered in various ways. For example, it is sufficient to select an appropriate deletion picture so that a storable capacity of a predetermined amount or more is secured in a buffer memory area.

Even when a series of picture data taken by one-time continuous shooting are, for example, thinned and deleted, sufficient quality may be maintained with the remaining series of picture data in some cases, such as a case in which the continuous shooting speed is fast. In such a case, thinning deletion is preferable in terms of maintaining taken pictures as much as possible.

C of FIG. 7 is an example in which, from among pieces of buffer data BDT, a picture to be left and a picture to be deleted are selected under predetermined conditions, and the pieces of buffer data BDT selected as pictures to be deleted are deleted.

For example, the upper part of C of FIG. 7 illustrates a state in which pieces of picture data SG1 to SG8 are temporarily stored as the buffer data BDT. As shown in the lower part of the same drawing, in a case in which, for example, only the picture data SG3 is selected as a picture to be left among the pieces of picture data SG1 to SG8, the other pieces of picture data SG1, SG2, and SG4 to SG8 are deleted. As a result, a storable capacity of a predetermined amount or more is secured in the buffer memory area.

Predetermined conditions in the case of selecting pictures to be deleted as above may be considered in various ways. The predetermined conditions may be conditions based on a result of picture recognition/detection processing, conditions of an imaging operation state, and the like. For example, it is preferable to select and delete data with high probability of failure using the following conditions.

Auto-Focus (AF) Detection Value

For example, a contrast value of picture data is detected as a detection value for AF control. According to the detection value, a focusing state of the picture can be determined. Therefore, it is possible to determine a contrast value of each picture data as the buffer data BDT and perform selection so that picture data in a good focusing state is left, and picture data in a worse focusing state (for example, a picture imaged in the AF control process) is deleted.

Facial Detection Result

Subject picture detection is performed for each picture data as buffer data BDT, and whether a facial picture is detected is determined. Leaving pictures from which a face is detected and setting pictures from which a face is not detected as pictures to be deleted may be considered. As a result, it is possible to leave pictures in which a subject person is clearly shown.

Note that in a case in which a face is able to be detected from a plurality of pictures, picture data to be left may be further narrowed down with conditions such as the size of the face, the position of the face, the relationship between the position of the face and the focus position, and the like to increase the number of pictures to be deleted so that a predetermined storable capacity is secured.

Composition Determination Result

Composition determination is performed by performing picture analysis on each picture data as buffer data BDT. For example, quantifying the quality of a composition and setting picture data to be deleted in order from picture data with the lowest point may be considered. As a result, a picture with a good composition may be left. Particularly, in the case of continuous shooting, since composition often changes slightly in a series of pictures due to movement of the user, camera shake, or the like during the continuous shooting, it is useful to select and keep pictures with optimum composition.

Shake Amount Information of Camera Shake

For example, in a case in which the amount of camera shake is measured by a gyro sensor or the like in the sensor unit 14, the amount of camera shake during imaging of each picture data as buffer data BDT is stored and used for determination. Picture data with a large amount of camera shake is set as picture data to be deleted.

Sound (Such as Golf Ball or Baseball Hitting Sound)

Although omitted in FIG. 2, a digital camera is usually equipped with a microphone so that voice input/recording is possible. Therefore, audio data at the time of imaging is saved, picture data at a timing at which distinguished audio data is obtained is set as picture data to be saved, and the other pieces of picture data are set as picture data to be deleted. For example, several pieces of picture data based on a timing imaged at the timing of golf or baseball hitting sound are saved, and picture data imaged at a time point away from the timing is set as picture data to be deleted. As a result, a particularly important scene may be left during continuous shooting.

Illuminance Condition

In a case in which the sensor unit 14 has an illuminance sensor, and an illuminance state at each imaging timing of continuous shooting can be determined, or in a case in which the illuminance state of each picture data can be determined by picture analysis, selecting is performed according to the illumination condition. For example, picture data which is a frame with less influence of flicker is saved, and other pieces of picture data are set as picture data to be deleted. In the case of a specific imaging mode such as a fireworks mode, the picture data to be left is selected according to the screen brightness, and the other pieces of picture data (for example, dark pictures) are set as picture data to be deleted.

Lens Condition

Selection is performed in accordance with an operation state of a lens by the optical system 11 at the time of imaging each picture data as the buffer data BDT.

For example, selection is performed under wide/tele conditions. Since picture data in the wide angle (wide) state allows a subject to be extracted by trimming, a wide picture is left, and pictures on the tele side are set as pictures to be deleted.

Also, selection is performed according to the zoom lens operating speed in the case of power zooming.

Also, selection is performed according to an operation speed of a focus lens. In any of these cases, picture data imaged during operation (a period in which the operation speed is fast) is set as picture data to be deleted by priority.

Picture with Less Inter-Frame Difference

From among pieces of picture data as the buffer data BDT taken by one-time continuous shooting, a plurality of pieces of picture data with small inter-frame differences are selected. From among the plurality of pieces of picture data, picture data that seems to be more valuable (picture with no out-of-focus, picture in which a main subject is shown in large size, etc.) are left, and the other pieces of picture data are set as picture data to be deleted.

As described above, by various conditions, it is possible to select pictures to be deleted and pictures to be left without being deleted from among the pieces of picture data as the buffer data BDT. As a result, pictures having highest possible quality are left, and loss due to deletion for securing the buffer memory capacity for the user can be minimized.

However, in the above-described condition determination, there is an example in which picture analysis is necessary. For example, in a case in which picture analysis is performed by the second processing unit 42, the selection based on the above-described condition determination can be used for partially deleting the buffer data BDT2 in the second buffer 52.

Of course, if information for the above-described condition determination is known at the time of read-out processing, the information can also be applied to the partial deletion of the buffer data BDT1 of the first buffer 51.

4. Display of Process Progress

However, the above-described deletion of the buffer data BDT is executed by operating the forced return button 3 when the user wants to perform continuous shooting immediately after finishing waiting while waiting immediately after continuous shooting until the next continuous shooting is possible. The waiting immediately after continuous shooting is a period during which signal processing up to recording the buffer data BDT on the recording medium 15*a* has not been completed.

Of course, when the signal processing is completed, the user can start the next continuous shooting without operating the forced return button 3.

Therefore, while waiting until returning to a state in which continuous shooting is possible, the user operates the forced return button 3 as necessary (in response to occurrence of a scene that he or she want to take picture of).

Since manipulating the forced return button 3 has a possibility of causing a scene taken immediately before to be sacrificed, the user may be confused as to whether he or she should operate the forced return button 3. Considering this, it is preferable for the user to clearly know up to which picture, during immediately-preceding continuous shooting, the processing has been completed in a standby period.

Therefore, in the present embodiment, the progress of signal processing during standby is presented to the user. This will be described with reference to FIG. 8.

A of FIG. 8 illustrates pieces of picture data SG1 to SGm obtained by continuous shooting imaging. It is assumed that processing up to a recording process has not been completed yet for the series of picture data SG1 to SGm obtained by the continuous shooting.

In this case, for example, as shown in B of FIG. 8, a developed picture 70, a recorded picture 71, and a mark 72 indicating that recording of a picture indicated by the recorded picture 71 on the recording medium 15*a* has been completed is displayed on the display unit 17.

The developed picture 70 shows a picture after the processing in the second processing unit 42 is completed.

The recorded picture 71 shows a picture whose processing up to the media output by the third processing unit 43 has been completed.

For example, by displaying such a process progress, the user can recognize up to which picture the pictures will be saved even if the forced return button 3 is pressed during standby.

For example, in the example shown in B of FIG. 8, the user can recognize that pieces of picture data up to the picture data SG3 can be surely saved. Also, the user can recognize that processing up to a development process has been completed for pieces of picture data up to picture data SGm-1.

When the user wants to save at least the picture data SGn, the user may operate the forced return button 3 before all of the processes are completed while measuring a timing by a progress display. As a result, it is also possible to not miss the current scene and to leave important pictures for the immediately-preceding imaged scene.

Note that, as a situation, it is assumed that the user is trying to decide whether to operate the forced return button 3 while a scene that he or she wants to take picture of is placed in front of the user. Therefore, it is better to simplify the display. To avoid confusion of the user, it is also desirable to display only the recorded picture 71 and the mark 72 as shown in C of FIG. 8. As a result, the user can clearly recognize a picture that can be saved even when the forced return button 3 is operated.

Alternatively, at least the last image to be left may be displayed in accordance with a deletion processing method according to the operation of the forced return button 3. For example, in a case in which complete deletion or partial deletion of the first buffer 51 is set as the deletion processing method, the picture data in the second buffer 52 is not deleted and signal processing up to recording is performed thereon. Therefore, even in such a case, displaying the developed picture in the second processing unit 42 also allows the user to be presented with up to which picture the pictures will be left in the immediately-preceding continuous shooting imaging.

Performing such a display of a process progress in the electronic viewfinder 19 may also be considered. The display unit 17 and the electronic viewfinder 19 are used complementarily. For example, when the user looks into the electronic viewfinder 19, the display of the electronic viewfinder 19 is turned on and the display of the display unit 17 is turned off, and when the user is not looking into the electronic viewfinder 19, the display of the electronic viewfinder 19 is turned off, and the display of the display unit 17 is turned on. Therefore, at the time of standby, display of the process progress as described above may be performed on the side that is turned on.

5. Structure for Operation

As shown in A of FIG. 1, the forced return button 3 is provided at a position on the main body behind the lens barrel 8. Since this forced return button 3 is an operation involving deletion of imaged picture data, it is important to prevent erroneous operation as much as possible.

As one of the configurations for so-called fail-safe, it is preferable that the forced return button 3 is arranged such that the forced return button 3 is unable to be operated with at least the user's right hand gripping the grip portion 9. Particularly, it is desirable that the forced return button 3 is provided to be unable to be operated simultaneously with an operating element for an imaging starting operation, i.e., the release button 2 with one hand (in this case, the right hand).

The arrangement position of the forced return button 3 shown in A of FIG. 1 is a position which is not normally reached by the right hand gripping the grip portion 9. In this way, the forced return button 3 is prevented from being mistakenly pressed as the release button 2.

Also, since the forced return button 3 is spaced apart from the release button 2 as described above, the forced return button 3 is not operated unless the user intentionally presses the forced return button 3, and thus it is suitable for avoiding erroneous operation.

On the other hand, it is requested that the forced return button 3 be able to be operated immediately in accordance with a scene in front of the user during standby. The user is in a panic situation for a moment. Because of this, it is not suitable to arrange a cover on the button to prevent erroneous operation, or to set an operation mode such as operation related to the menu display of the display unit 17.

That is, it is desirable that an operating element for forced return be able to be operated impromptu in the housing, like the forced return button 3.

Therefore, in the present embodiment, the forced return button 3 is arranged at an upper left portion of the housing for the forced return button 3 to be operated with left hand while the grip portion 9 is gripped by the right hand.

By requesting the user to operate with the left hand, it is assumed that it is an intentional operation by the user and can be operated instantly even with the right hand holding the camera.

Note that, for example, as shown in A of FIG. 1, as a preferred possession mode for the imaging device 1 having a relatively large lens barrel 8, it is preferable that the grip portion 9 is gripped with the right hand and the left hand is attached to a lower portion of the housing. That is, the left hand of the user is below the housing. Therefore, arranging the forced return button 3 at an upper portion of the housing is suitable since the forced return button 3 is prevented from being unintentionally pushed by the user. Particularly, for the operating element to eliminate unintentional operation (erroneous operation) of the user, it is suitable to arrange the forced return button 3 on the upper left of the main body.

Note that although it is only necessary to determine an appropriate location for button arrangement in accordance with the design of the housing of the imaging device, a position at which the forced return button 3 is spaced apart from the release button 2, a position at which it is difficult to operate the forced return button 3 and the release button 2 simultaneously with one hand, a position at which the forced return button 3 may be intentionally operated with the other hand, and the like are preferable.

Also, the operating element is not necessarily demanded to be in the form of a button. This will be described below as a modification.

It is possible to achieve fail-safe by considering the operation procedure instead of the arrangement of operating elements.

For example, although deletion of buffer data BDT may be performed impromptu in accordance with the operation of the forced return button 3, erasing of the buffer data BDT may also be performed when the release button 2 is operated immediately after the operation of the forced return button 3 or while the forced return button 3 is pressed.

By deleting the buffer data BDT only when a plurality of procedures are performed in this way, the possibility of erroneous deletion due to erroneous operation can be further reduced. A specific example will be described in a processing example according to a third embodiment.

6. Processing Example 6-1: First Embodiment

Hereinafter, various specific processing examples by the control unit 30 will be described as continuous shooting control including processing according to the operation of the forced return button 3.

FIG. 9 illustrates a processing example in a case in which the user performs continuous shooting operation, as a processing example according to the first embodiment. Note that although the control unit 30 of the imaging device 1 performs various control processes for normal still picture imaging, moving picture imaging, picture reproduction, mode setting, and the like, description thereof will be omitted, and only a process related to continuous shooting will be described below.

A flowchart of FIG. 9 illustrates a process in a case in which imaging operation is performed as a continuous shooting mode.

In Step S101 of FIG. 9, the control unit 30 monitors the end of operation. For example, an end of a continuous shooting mode, an end of imaging (shift to a reproduction operation), a power off, or the like is the end of operation in this case. Processing examples of such cases will be omitted.

In the continuous shooting mode, the control unit 30 waits for the continuous shooting operation (the operation of the release button 2) in Step S102 in a period until the end of the operation.

Until the operation of the release button 2 is detected, normally, Steps S102, S106, and S108 are performed in that order to control a through picture display. Then, the process returns to Steps S101 and S102.

Note that Step S106 branches the process based on whether waiting immediately after continuous shooting is in progress (whether it is before completion of processing continuously-shot picture data), and normally, the through picture display is controlled in Step S108.

As the control of the through picture display, the control unit 30 controls the signal processing unit 20 to generate through picture display data for each frame data read out from the image sensor 12 and instructs the display unit 17 or the electronic viewfinder 19 to display the generated through picture display data.

When the operation of the release button 2 is detected, the control unit 30 proceeds from Step S102 to Step S103 and starts the continuous shooting operation. That is, exposure/signal transmission as a still picture by continuous shooting from the image sensor 12 or signal processing in the signal processing unit 20 is started. As a result, the signal processing unit 20 acquires picture data obtained by continuous shooting from the image sensor 12, performs processes of the first processing unit 41, the second processing unit 42, and the third processing unit 43, and starts an operation for recording the continuously-shot pictures on the recording medium 15a.

In Step S104, the control unit 30 monitors the end of the continuous shooting. For example, when the user ends the operation of the release button 2 (ends pressing the release button 2), it is determined that the end of the continuous shooting is reached. Alternatively, when the maximum time capable of continuous shooting is reached (when the first buffer 51 becomes full capacity), it is determined that the end of the continuous shooting is reached.

When end of the continuous shooting is reached, the control unit 30 ends the reading out of the continuously-shot pictures in the image sensor 12 in Step S105.

However, as described above, at a time point at which the user stops the continuous shooting operation, the continuous shooting is not necessarily ended until the end of a series of picture data obtained by continuous shooting (the processing of the third processing unit 43).

Therefore, until signal processing for all of the series of continuously-shot pictures is completed, the control unit 30 proceeds from Step S106 to Step S107 and controls the display of the process progress.

As shown in B of FIG. 8 or C of FIG. 8, the recorded picture 71 or the like is displayed on the display unit 17 or the electronic viewfinder 19, and the user is presented with progress of the current process.

In Step S109, the control unit 30 monitors whether the operation of the forced return button 3 is performed.

Particularly, in a period in which the operation of the forced return button 3 is not detected, the completion of the signal processing for continuous shooting is confirmed in Step S106, and the process progress in Step S107 is continuously displayed until completion. Therefore, the user can grasp the recording completion of each picture of the continuous shooting with time.

When each picture data processing of the continuous shooting in the signal processing unit 20 is completed while the operation of the forced return button 3 is not performed, after such a time point, the process of the control unit 30 proceeds from Step S106 to Step S108, the through picture display control is resumed, and the process returns to the monitoring process of Steps S101 and S102.

Therefore, when the user operates the release button 2 again, the control unit 30 proceeds to Step S103 again and starts the continuous shooting.

On the other hand, while waiting for completion of the signal processing after the end of the continuous shooting, the control unit 30 performs monitoring within the loop of Steps S106, S107, and S109, and normally, continuous shooting is not started even when the user operates the release button 2 during this time.

If the user wants to perform continuous shooting during the standby, it is necessary to operate the forced return button 3.

In a case in which the forced return button 3 is operated, the control unit 30 detects the operation of the forced return button 3 in Step S109 and proceeds to Step S110. Here, the control unit 30 checks whether unprocessed buffer data BDT is left in a buffer memory area (that is, in the configuration of FIG. 4, the first buffer 51 and the second buffer 52) used by the signal processing unit 20, and when unprocessed buffer data BDT is left, proceeds to Step S111 and instructs all buffer data BDT to be deleted in the first buffer 51 and the second buffer 52. In accordance with the instruction, the signal processing unit 20 deletes all of the buffer data BDT.

Then, the control unit 30 returns to Steps S101 and S102. In a case in which the user operates the release button 2 immediately afterwards, the control unit 30 proceeds the process from Step S102 to Step S103 and starts continuous shooting.

Note that in a case in which it is determined in Step S110 that there is no unprocessed buffer data BDT, the process returns to Steps S101 and S102, and a state in which continuous shooting is possible is reached. Even when signal processed picture data in the next stage remains in the buffer memory area, the remaining picture data may be treated as overwritable data.

By the above-described process, even while waiting for completion of signal processing after continuous shooting, during which it is normally not possible to resume continuous shooting, the user can forcibly delete the buffer data BDT by the operation of the forced return button 3 and resume the continuous shooting.

6-2: Second Embodiment

A processing example according to a second embodiment is illustrated in FIG. 10. Note that the same processes as in FIG. 9 are denoted by the same step numbers, and repetitive description is avoided.

Steps S101 to S109 are the same as those shown in FIG. 9. In the processing example of FIG. 10, in a case in which the forced return button 3 is operated, the control unit 30 proceeds from Step S109 to Step S120, checks whether unprocessed buffer data BDT1 remains in the first buffer 51, and when the unprocessed buffer data BDT1 is left, the control unit 30 proceeds to Step S121 and instructs the signal processing unit 20 to delete all of the buffer data BDT1 in the first buffer 51. In accordance with the instruction, the signal processing unit 20 deletes all of the buffer data BDT of the first buffer 51.

Then, the control unit 30 returns to Steps S101 and S102. In a case in which the user operates the release button 2 immediately afterwards, the control unit 30 proceeds the process from Step S102 to Step S103 and starts continuous shooting.

Note that in a case in which it is determined in Step S120 that there is no unprocessed buffer data BDT1 in the first buffer 51, the process returns to Steps S101 and S102, and the state in which continuous shooting is possible is reached. Even when the buffer data BDT1 processed after the second processing unit 42 remains in the first buffer 51, the remaining buffer data BDT1 may be treated as overwritable data.

By the above-described process, even while waiting for completion of signal processing after continuous shooting, during which it is normally not possible to resume continuous shooting, the user can forcibly delete the buffer data BDT by the operation of the forced return button 3 and resume the continuous shooting.

Particularly, by opening the first buffer 51, it becomes possible to read out the picture data as a continuous shooting from the image sensor 12. In this case, since the buffer data BDT of the second buffer 52 (picture data on which development processing is completed) is not discarded, the number of pictures saved in the recording medium 15a can be increased in comparison to the first embodiment even when the forced return button 3 is operated.

Note that, here, although the example in which the first buffer 51 is subjected to deletion has been given as an example in which a part of the buffer memory area is subjected to deletion, a case in which only the second buffer 52 is subjected to deletion may also be considered. Further, in a case of having the first buffer 51, the second buffer 52, and the third buffer 53 as shown in FIG. 5, an example in which the first buffer 51 and the second buffer 52 are subjected to deletion may also be considered.

6-3: Third Embodiment

A processing example according to the third embodiment will be described with reference to FIGS. 11 and 12.

In Step S200 of FIG. 11, the control unit 30 monitors the end of the operation of the continuous shooting mode, which is the same as Step S101 in FIG. 9 above.

In the continuous shooting mode, the control unit 30 waits for the continuous shooting operation (operation of the release button 2) in Step S201 in a period until the end of the operation is reached.

Until the operation of the release button 2 is detected, normally, Steps S201, S203, and S204 are performed in that order to control a through picture display. Then, the process returns to Steps S200 and S201.

Note that like Step S106 of FIG. 9, Step S203 branches the process based on whether waiting immediately after continuous shooting is in progress (whether it is before completion of processing continuously-shot picture data), and normally, the through picture display is controlled in Step S204.

When the operation of the release button 2 is detected, the control unit 30 proceeds from Step S201 to Step S202 and starts the continuous shooting operation by processing an imaging sequence.

The processing content of the imaging sequence is illustrated in FIG. 12.

In Step S210 of FIG. 12, the control unit 30 checks whether a storable capacity C1 of the first buffer 51 is equal to or greater than a predetermined threshold value th1, for example.

The threshold value th1 is preset as a value indicating the storage capacity that does not affect execution of continuous shooting.

Particularly, when waiting for completion of signal processing of continuously-shot picture data is not in progress, the first buffer 51 has sufficient free capacity (storable capacity C1).

When the storable capacity C1 is equal to or greater than the threshold value th1, the control unit 30 proceeds to Step S214 and starts exposure/signal transmission as a still picture by continuous shooting from the image sensor 12 or signal processing in the signal processing unit 20. As a result, the signal processing unit 20 acquires picture data obtained by continuous shooting from the image sensor 12, performs processes of the first processing unit 41, the second processing unit 42, and the third processing unit 43, and starts an operation for recording the continuously-shot pictures on the recording medium 15a.

In Step S215, the control unit 30 monitors the end of the continuous shooting. For example, when the user ends the operation of the release button 2 (ends pressing the release button 2), it is determined that the end of the continuous shooting is reached. Alternatively, when the maximum time capable of continuous shooting is reached (when the first buffer 51 becomes full capacity), it is determined that the end of the continuous shooting is reached.

When end of the continuous shooting is reached, the control unit 30 ends the reading out of the continuously-shot pictures in the image sensor 12 in Step S216. As a normal operation, the processing S202 as the imaging sequence is completed as described above, and the process proceeds to Step S203 of FIG. 11.

Even when continuous shooting imaging is ended, since processing up to the processing of the third processing unit 43 may not be ended in the signal processing unit 20 until the end of a series of picture data obtained by continuous shooting in some cases, in Step S203, the control unit 30 branches the process based on whether signal processing for the continuous shooting has been completed.

Until signal processing for all of the series of continuously-shot pictures is completed, the control unit 30 proceeds from Step S203 to Step S205 and performs control of a process progress display. That is, as shown in B of FIG. 8 and C of FIG. 8, the control unit 30 causes the recorded picture 71 or the like to be displayed on the display unit 17 or the electronic viewfinder 19, and the user is presented with progress of the current process.

In Step S206, the control unit 30 monitors whether the forced return button 3 has been operated.

Particularly, when the operation of the forced return button 3 is not detected, the control unit 30 sets a forced return flag FC to 0 in Step S203. Then, the process returns to Steps S200 and 201.

That is, when the user simply waits, the process transitions to the loop of Steps S203, S205, S206, S208, S200, S201, and S203.

However, even while waiting for completion of signal processing for the immediately-preceding continuous shooting, the user may operate the release button 2 so that the process proceeds to the imaging sequence from Step S201 to S202.

In that case, the process shown in FIG. 12 is performed even while waiting for completion of signal processing.

The storable capacity C1 of the first buffer 51 is checked in Step S210. Even while waiting for the completion of signal processing, the processing of the second processing unit 42 may have been already performed at a time point at which the release button 2 is operated this time, and the storable capacity of the first buffer 51 may be sufficiently open in some cases. Therefore, when the storable capacity C1 is equal to or greater than the threshold value th1, the control unit 30 proceeds to Step S214 and starts a new continuous shooting operation in the image sensor 12 and the signal processing unit 20.

On the other hand, in some cases, the storable capacity of the first buffer 51 may not be sufficient yet at the time point at which the release button 2 is operated while waiting for the completion of signal processing.

In that case, the control unit 30 proceeds from Step S210 to Step S211 and checks whether the forced return flag FC is equal to 1. In a case in which the user does not operate the forced return button 3 and, instead, operates the release button 2, the forced return flag FC is equal to 0 (S206 to S208 in FIG. 11).

Therefore, in a case in which, simply, the release button 2 is operated while waiting for the completion of signal processing, and the storable capacity of the first buffer 51 is not sufficient, the control unit 30 proceeds to Step S213, causes the buffer-full state to be displayed on the display unit 17 or the electronic viewfinder 19, and ends the process of the imaging sequence.

That is, the user is notified of the reason why continuous shooting is unable to be started, the continuous shooting operation (operation of release button 2) is disabled, and continuous shooting is not started.

When the user wants to perform continuous shooting while waiting for the completion of signal processing, the user has to operate the forced return button 3. Particularly, in this example, operation of simultaneously pressing the forced return button 3 and the release button 2 (or pressing the release button 2 while the forced return button 3 is pressed) is necessary.

In a case in which the forced return button 3 is operated while waiting for the completion of signal processing, the control unit 30 proceeds from Step S206 to Step S207 in FIG. 11 and sets the forced return flag FC to 1. Then, in Step S209, the control unit 30 checks whether the release button 2 is operated simultaneously with the forced return button 3 in Step S209.

That is, in Step S209, the control unit 30 checks whether the operation of the release button 2 is being performed while the operation of the forced return button 3 is continued.

Even when the forced return button 3 is pressed, the process returns from Step S208 to Steps S200 and S201 with the forced return flag FC being equal to 0 when the release button 2 is not operated simultaneously with the forced return button 3. That is, the result is the same as that of the above-described case in which the forced return button 3 is not operated.

In a case in which the user operates the release button 2 together with the operation of the forced return button 3, the process shifts to the processing of the imaging sequence in step S202 with the forced return flag FC being equal to 1.

In that case, in Step S210 of FIG. 12, the control unit 30 first checks the storable capacity of the first buffer 51. When the storable capacity C1 is equal to or greater than the threshold value th1, since there is no particular problem, the process proceeds to Step S214, and the control unit 30 starts the continuous shooting operation.

Since waiting for the completion of signal processing is in progress, it is assumed that the storable capacity C1 of the first buffer 51 does not satisfy the threshold value th1 at the time point of Step S210. In that case, in Step S211, the control unit 30 checks the forced return flag FC. In this case, since the forced return flag FC is equal to 1, the control unit 30 proceeds to Step S212, and for example, deletes all or a part of the buffer data BDT1 stored in the first buffer 51.

As a result, by securing the storable capacity of the first buffer 51, the control unit 30 proceeds to Step S214 and starts the continuous shooting operation.

By the above-described process, even while waiting for the completion of signal processing after continuous shooting, during which it is normally not possible to resume continuous shooting, the user can forcibly delete the buffer data BDT1 by the simultaneous operation of the forced return button 3 and the release button 2 and resume the continuous shooting.

Note that although the storable capacity C1 of the first buffer 51 is checked in Step S210 above, the storable capacity of the second buffer 52 may also be determined. For example, when the storable capacity of one or both of the first buffer 51 and the second buffer 52 is not sufficient, proceeding to Step S211 may be considered.

Although a specific example of the buffer deletion process in Step S212 will be described below, in addition to being applied to only the first buffer 51, the specific example may also be applied to both the first buffer 51 and the second buffer 52, or applied to only the second buffer 52.

In the above example, in a case in which the release button 2 is operated while the forced return button 3 is operated, the buffer data BDT is deleted as necessary. As a result, it is suitable for preventing erroneous operation.

However, a forced return may be performed even in a case in which the release button 2 and the forced return button 3 are not operated simultaneously, for example, in a case in which the release button 2 is operated within a predetermined time after the forced return button 3 is operated.

In either case, by operation of the two operating elements being necessary, deletion of the buffer data BDT due to erroneous operation can be effectively prevented.

A specific example of the deletion of the buffer in Step S212 of FIG. 12 will be described with reference to FIGS. 13, 14 and 15. An example in which the first buffer 51 is subjected to deletion will be described.

A of FIG. 13 is the most typical method shown in A of FIG. 6. The control unit 30 instructs deletion of all of the buffer data BDT1 in the first buffer 51 in Step S220. In accordance with the instruction, the signal processing unit 20 deletes all of the buffer data BDT1 of the first buffer 51 and allows continuous shooting to be resumed.

B of FIG. 13 shows an example in which, from among pieces of buffer data BDT1 of the first buffer 51, picture data being read out by the second processing unit 42 is protected instead of being deleted.

In Step S230, the control unit 30 checks a status of the picture being read out from the first buffer 51.

In a case in which the second processing unit 42 reads out any picture data from among the pieces of buffer data BDT1, the control unit 30 instructs a single piece of picture data to be deleted every time in order from the oldest picture data in Step S232 until it is checked in Step S231 from the status that the reading-out has been completed.

Also, when reading-out of the picture data that is being read out is completed, the control unit 30 causes all the remaining buffer data BDT1 to be deleted in Step S233.

In this way, signal processing up to recording is performed on the picture data being read out.

A of FIG. 14 illustrates an example of deleting the necessary amount in order from the oldest data as shown in B of FIG. 6.

In Step S240, the control unit 30 causes the oldest picture data from among the pieces of buffer data BDT1 of the first buffer 51 to be deleted.

In Step S241, the control unit 30 updates the storable capacity C1 of the first buffer 51 in accordance with the deletion. In Step S242, the control unit 30 checks whether the storable capacity C1 is equal to or larger than the threshold value th1. When the storable capacity C1 is not equal to or greater than the threshold value th1 yet, the control unit 30 returns to step S240, causes the oldest picture data at that time to be deleted, and performs Steps S241 and S242.

At Step S242, since a sufficient capacity can be secured upon the time point at which the storable capacity C1 of the first buffer 51 is equal to or greater than the threshold value th1, the deletion process is ended.

B of FIG. 14 illustrates an example of deleting the necessary amount in order from the newest data as shown in A of FIG. 7.

In Step S250, the control unit 30 causes the newest picture data from among the pieces of buffer data BDT1 of the first buffer 51 to be deleted.

In Step S251, the control unit 30 updates the storable capacity C1 of the first buffer 51 in accordance with the deletion. In Step S252, the control unit 30 checks whether the storable capacity C1 is equal to or larger than the threshold value th1. When the storable capacity C1 is not equal to or greater than the threshold value th1 yet, the control unit 30 returns to step S250, causes the newest picture data at that time to be deleted, and performs Steps S251 and S252.

At Step S252, since a sufficient capacity can be secured upon the time point at which the storable capacity C1 of the first buffer 51 is equal to or greater than the threshold value th1, the deletion process is ended.

A of FIG. 15 illustrates an example of performing thinning deletion as illustrated in B of FIG. 7.

In Step S260, the control unit 30 specifies a range of a series of picture data obtained by continuous shooting from among the pieces of buffer data BDT1 of the first buffer 51.

In Step S261, the control unit 30 causes every even-numbered picture data from among the series of picture data to be deleted. The control unit 30 may also cause every odd-numbered picture data to be deleted. Alternatively, pieces of picture data may be deleted by skipping two pieces of picture data, skipping three pieces of picture data, etc.

In Step S262, the control unit 30 checks whether a series of data obtained by another continuous shooting is left, and in a case in which the series of data obtained by the other continuous shooting is left, the control unit 30 also causes thinning deletion to be executed in Steps S260 and S261 for the series of picture data.

The process is ended at a time point at which the thinning deletion is performed for each continuous shooting.

Note that even during the thinning deletion, the deletion process may be ended at a time point at which the storable capacity C1 of the first buffer 51 becomes equal to or larger than the threshold value th1.

In a case in which the storable capacity C1 of the first buffer 51 does not become equal to or larger than the threshold value th1 even after completion of the thinning deletion, the control unit 30 may further perform thinning deletion on the first buffer 51. Alternatively, in that case, deletion may be performed continuously with different deletion methods as shown in A of FIG. 14 and B of FIG. 14.

B of FIG. 15 illustrates an example in which deletion is performed by performing selection with predetermined conditions as shown in C of FIG. 7.

In Step S270, the control unit 30 acquires conditions for selection of deletion/non-deletion. The selection conditions may be fixedly determined, or may have been previously selected by the user's operation. As described above, various conditions can be considered.

In Step S271, the control unit 30 selects picture data to be deleted according to the conditions.

In Step S272, the control unit 30 causes the picture data selected as picture data to be deleted to be deleted, and ends the process.

In a case in which the storable capacity C1 of the first buffer 51 does not become equal to or larger than the threshold value th1 even after completion of deleting picture data which is selected with certain conditions, the control unit 30 may select picture data to be deleted from among the pieces of buffer data BDT1 remaining in the first buffer 51 with different conditions and cause the selected picture data to be deleted to be deleted. Alternatively, in that case, deletion may be performed continuously with different deletion methods as shown in A of FIG. 14 and B of FIG. 14.

C of FIG. 15 illustrates a processing example in a case in which the user can select a deletion process method.

In Step S280, the control unit 30 sets a deletion process method that has been previously selected by the user's operation as a process to be executed. For example, a deletion process method selected by the user from among, for example, the complete deletion shown in A of FIG. 13, complete deletion except for data being read out shown in B of FIG. 13, deletion in order from the oldest picture data shown in A of FIG. 14, and the like is selected.

In Step S281, deletion control is executed by the selected deletion process method. That is, in Step S281, any process from among those shown in A of FIG. 13, B of FIG. 13, A of FIG. 14, B of FIG. 14, A of FIG. 15, and B of FIG. 15 is performed.

In this way, the user can select a preferable deletion process method corresponding to his or her use case.

Note that a processing example of a case in which partial deletion of buffer data is performed as shown in the above-described B of FIG. 13, A of FIG. 14, A of FIG. 15, B of FIG. 15, and C of FIG. 15 may also be applied to Step S111 of FIG. 9 and Step S121 of FIG. 10.

7. Application to Super Slow Moving Picture Imaging

In the above-described embodiment, description has been given by focusing on the case of continuous shooting. However, the above-described technique can also be applied in the case of super slow moving picture imaging.

As described above, the imaging recording of a super slow moving picture is a function of storing data read out from the image sensor 12 at a very high speed in the buffer memory area and creating a slow motion moving picture while developing the stored data at normal speed.

Since the picture data read out from the image sensor 12 is stored and developed at once until the buffer memory area becomes full, the imaging available time is limited by the number of pieces of picture data that can be written in the buffer memory area, and the next super slow moving picture imaging is unable to be started until the buffer memory area is empty.

Therefore, the processes of the above-described first to third embodiments are also applied to the case of the super slow moving picture mode. That is, when the storable capacity C1 is not sufficient in the buffer memory area and thus the super slow moving picture imaging is unable to be resumed, the buffer memory area is opened by operation of the forced return button 3 (or combined operation of the forced return button 3 and the release button 2) to start the super slow moving picture imaging.

As a result, it is possible to prevent scenes preferable for the super slow moving picture imaging from being missed.

Note that even in this case, complete deletion or partial deletion may be performed on the buffer data BDT in the buffer memory area. In the case of performing partial deletion of picture data (frame data) as a super-slow moving picture, halving a time length of a moving picture by, for example, discarding data in the former half, data in the latter half, or data before and after to return to super-slow moving picture imaging may be considered. Also, in this case, halving an imaging available time length may be considered in the super-slow moving picture imaging to be resumed.

Note that the processing of the embodiment can be applied to super-slow moving picture imaging in exactly the same way. Because of this, the processing is also suitable for a case where super-slow moving picture imaging and continuous shooting are performed alternately.

For example, even in the case where the user wants to perform super-slow moving picture imaging while waiting for completion of processing immediately after continuous shooting, or in a case where the user wants to perform continuous shooting while waiting for completion of processing immediately after super-slow moving picture imaging, applying the above-described processing and securing a storable capacity of the buffer memory area to start super-slow moving picture imaging or continuous shooting imaging may be considered.

8. Summary and Modifications

The embodiments have been described above. According to the techniques of the embodiments, the following effects can be obtained.

The imaging device 1 according to the embodiment includes the signal processing unit 20 configured to cause a series of picture data being continuously acquired (whose imaging times are consecutive) by continuous shooting, super-slow moving picture imaging, or the like to be temporarily stored in a buffer memory area sequentially, read out the series of picture data from the buffer memory area, and perform predetermined signal processing, and the control unit 30 configured to cause the signal processing unit 20 to execute complete or partial deletion of the picture data stored in the buffer memory area, on the basis of detection of predetermined operation (operation of the forced return button 3) while signal processing is being performed on the series of picture data in the signal processing unit 20. That is, the buffer memory area is opened partially or entirely.

By the control unit 30 causing complete or partial deletion of the picture data stored in the buffer memory area to be executed on the basis of the user's operation, a state in which the next imaging (continuous shooting imaging or super-slow moving picture imaging) can be started instantly may be reached.

Because of this, a situation of losing an imaging opportunity due to waiting for processing can be eliminated. Particularly, since a situation in which the cameraman wants to take a picture of the current moment even if the he or she has to discard a picture taken immediately before may occur often, a function for not missing an imaging opportunity can be realized in such cases.

Also, since the erasing is performed on the basis of the user's intention, automatic erasing not desired by the user is not performed. Discarding an imaged picture is based on the user's choice to the end, and is not deletion that is unintended by the user.

In the third embodiment, the control unit 30 causes the picture data stored in the buffer memory area to be deleted in a case where the storable capacity C1 of the buffer memory area is less than the predetermined amount (threshold value th1) (S210 of FIG. 12).

Even in a case where deletion of picture data being buffered in the buffer memory area is requested by a predetermined operation (operation of the forced return button 3) by the user, there may be no necessity to delete the picture data when there is sufficient remaining storable capacity. Therefore, deletion of picture data is actually performed in a case where the remaining capacity is less than the predetermined amount.

As a result, in a case where deletion is not necessary, that is, in a situation in which sufficient capacity that allows continuous shooting imaging or super-slow moving picture imaging to be performed immediately after is secured, deletion of buffer data is not performed. Therefore, unprocessed picture data remaining in the buffer memory area may be kept without change for signal processing and may be recorded on the recording medium 15a. As a result, the amount of picture data to be deleted can be minimized.

In the third embodiment, the control unit 30 causes deletion of picture data stored in the buffer memory area to be executed in accordance with detection of the predetermined operation (operation of the forced return button 3) and the detection of operation to start imaging of the next series of picture data (operation of the release button 2) (Steps S206 and S209 in FIG. 11).

For example, the deletion control is not performed immediately by merely detecting the operation of the forced return button 3, which is an instruction to delete the picture data, and the deletion is executed in a case where the release button 2 is operated simultaneously with or immediately after the operation of the forced return button 3. There is no necessity to delete buffer data when continuous shooting imaging or super-slow moving picture imaging is actually not performed immediately afterwards. This is because signal processing is finished naturally with time, and the buffer capacity is recovered. When data is immediately deleted by only detecting the operation of the forced return button 3, data which does not have to be deleted (as a result, picture data which did not have to be deleted) may be deleted in some cases. Therefore, in a case where the operation for starting imaging (for example, operation of the release button 2) is checked, picture data is completely or partially deleted as necessary. As a result, deletion may be performed only when it is really necessary, and may not be carelessly deleted due to erroneous operation or the like. That is, the effect of the fail-safe function is achieved.

Note that in this sense, meaning of detecting operation of the release button 2 along with detecting operation of the forced return button 3 is not limited to the case where operations of the forced return button 3 and the release button 2 are performed simultaneously, and also includes a case where the release button 2 is operated within a predetermined amount of time (for example, within one second) from operation of the forced return button 3. This, is because, even in this case, it is possible to check the necessity of deleting the buffer data BDT by operating the release button 2, and deletion may be performed when the necessity is confirmed.

In practice, buffer data deletion may be performed only in a case of starting imaging operation that a certain amount of capacity of a buffer memory is necessary to be secured due to a difference between a read-out speed from the image sensor 12 and a signal processing speed, such as in continuous shooting imaging or super-slow moving picture imaging. For example, in a case where the operation of the release button 2 is a normal single still picture imaging operation, the deletion may not be executed.

On the other hand, in the first and second embodiments, the control unit 30 causes deletion of the picture data stored in the buffer memory area to be executed in accordance with only the condition of detecting the predetermined operation (operation of the forced return button 3) (FIG. 9, FIG. 10).

As a result, it is possible to promptly return to a state in which continuous shooting is possible with simple processing. For example, when a user is a person who can determine that a series of pictures is unnecessary immediately after the series of pictures are imaged, allowing to return to the state in which continuous shooting is possible (super-slow moving picture imaging is possible) instantly may facilitate use in some cases. A forced return in response to such a request can be realized.

In the embodiment, as described with reference to FIGS. 4 and 5, the case where the plurality of buffer memory areas (the first buffer 51, the second buffer 52, and the third buffer 53) for buffering picture data in another signal processing step is prepared by the signal processing unit 20 is shown. In the first embodiment, the example in which the control unit 30 causes the signal processing unit 20 to perform complete or partial deletion of picture data stored in the plurality of buffer memory areas in accordance with a predetermined operation has been described.

In the case where picture data is buffered for each of a plurality of steps in the signal processing process, standby is necessary until continuous shooting or the like immediately afterwards is possible in accordance with the remaining capacity in the buffer memory area of each part in some cases. Therefore, buffer data deletion is performed for the plurality of buffer memory areas.

As a result, it is possible to effectively return to the state in which continuous shooting imaging or super-slow moving picture imaging is possible. Particularly, it is suitable to return in a state in which functions such as continuous shooting imaging are maximally made effective. Although securing capacity in the first buffer 51 that buffers read-out data from the image sensor 12 is particularly effective in returning to the state in which continuous shooting imaging or the like is possible, a time taken until the first buffer 51 becomes full capacity is shortened in accordance with a situation of remaining capacity of the second buffer 52 or the third buffer 53, and in that case, the number of pictures that are continuously shot or the super-slow moving picture imaging time may be restricted in some cases. Therefore, by deleting the buffer data for the plurality of buffer memory areas (for example, all of the buffer memory areas), it is possible to reach a state in which continuous shooting imaging or super-slow moving picture shooting imaging is possible with the maximum imaging performance.

In the embodiment, the case where the control unit 30 causes the signal processing unit to execute complete or partial deletion of picture data stored in some of the buffer memory areas in accordance with a predetermined operation has also been mentioned.

As a result, it is possible to return to the state in which continuous shooting imaging or super-slow moving picture imaging is possible while deletion of picture data (deletion of unrecorded pictures) is reduced as much as possible. Due to the configuration of the signal processing unit 20, any buffer memory area that is a location that can be a bottleneck in the data processing process can be set as a buffer memory area subjected to deletion.

Particularly, in the second and third embodiments, an example in which a part of the buffer memory area subjected to deletion is the first buffer 51, which is the first buffer memory area used in the signal processing process of the signal processing unit 20 has been given.

For returning to the state in which continuous shooting or the like is possible, it is sufficient when at least securing of a capacity in the first buffer 51 that buffers read-out data from the image sensor 12 is performed. Therefore, by continuing signal processing without performing deletion in the subsequent buffer memory areas such as the second buffer 52 or the third buffer 53, the number of pictures being discarded can be reduced.

In the embodiment, an example in which deletion of picture data is performed in order from the oldest imaging time from among pieces of picture data stored in the buffer memory area in a case where partial deletion is executed on the pieces of picture data stored in the buffer memory area has been described (see B of FIG. 6 and A of FIG. 14).

As a result, in the case where some of the pieces of picture data in the buffer memory area are deleted, deletion of picture data whose imaging time is relatively new may be reduced as much as possible. For example, in accordance with a method of managing a buffer memory area, there may be a state in which picture data, on which signal processing has been performed already, remains in the buffer memory area normally due to a delay in routine deletion processing. In a case where such a situation occurs, it is suitable to delete picture data in order from the oldest picture data.

In the embodiment, an example in which deletion of picture data is performed in order from the newest imaging time from among pieces of picture data stored in the buffer memory area in a case where partial deletion is executed on the pieces of picture data stored in the buffer memory area has been described (see A of FIG. 7 and B of FIG. 14).

As a result, in the case where some of the pieces of picture data in the buffer memory area are deleted, deletion of picture data whose imaging time is relatively old may be reduced as much as possible. Therefore, the newest imaged picture is discarded. For example, considering a use case, a cameraman operates the forced return button 3 when he/she thinks that a picture taken immediately before is a failure and wants to promptly shift to imaging of the next scene. In such a case, it is highly likely that the picture data whose imaging time is the newest is one that the user considers as a failure.

The new data is a picture immediately before the end of continuous shooting, and for the user, there is a possibility that the new data is a picture after finishing taking the best scene (a situation of trying to end continuous shooting). Therefore, it may be considered that the user often has a small feeling of resistance for deletion of a new picture.

In a case of dealing with such a use case, it is suitable to delete in order from the newest picture data.

In the embodiment, an example in which thinning deletion is performed for a series of picture data in the order of imaging time stored in the buffer memory area in a case where partial deletion is executed for picture data stored in the buffer memory area has been described (see B of FIG. 7 and A of FIG. 15).

For example, when the continuous shooting speed is fast in continuous shooting imaging, sufficient quality of a series of picture data is obtained in some cases even when thinning is performed on the series of picture data by skipping a single piece of picture data. Considering this, securing the capacity of the buffer memory area by performing thinning deletion is suitable in terms of not wasting images that have already been taken as much as possible.

In the embodiment, an example in which pictures to be deleted are selected from among pieces of picture data stored in a buffer memory area with predetermined conditions and deleted in a case where partial deletion is executed for picture data stored in the buffer memory area has been described (see C of FIG. 7 and B of FIG. 15).

For example, by setting a picture with poor quality, a picture that is not suitable as continuous shooting, or the like as pictures to be deleted, a picture with good quality, a picture that is suitable for imaging purpose, or the like may be saved as much as possible without being deleted.

In the embodiment, an example in which deletion of picture data is executed except for picture data that is being read out from the buffer memory area in a case where deletion of picture data stored in the buffer memory area is executed has been described (see B of FIG. 13).

By allowing signal processing to be executed as it is for the picture data being read out for signal processing, it is possible to make use of pictures which have already been subjected to signal processing.

In the embodiment, an example in which one of a plurality of deletion processing methods is selected to execute deletion of picture data stored in a buffer memory area in a case where deletion of picture data stored in the buffer memory area is executed has been described (see C of FIG. 5).

For example, by the user preliminarily selecting a deletion processing method suitable for the user's use case, it is possible to perform partial deletion suitable for the circumstances of the user, and it is possible to promptly return to the state in which continuous shooting imaging is possible (or the state in which super-slow moving picture imaging is possible) after eliminating deletion undesirable for the user as much as possible.

Depending on the user, some users prefer complete deletion, in which deletion is clear. For such users, it is preferable to allow the user to select complete deletion rather than partial deletion. In the case of complete deletion, there is an advantage in that imaging can be performed with the maximum capability in continuous shooting imaging or super-slow moving picture imaging to be resumed.

Also, the user may be allowed to select which one of the buffer memory areas in the plurality of signal processing steps, such as the first buffer 51 and the second buffer 52, is to be subjected to deletion or whether to set all of the buffer memory areas to be subjected to erasure.

Even in this case, it is clear that all of the buffer memory areas are subjected to deletion, and the maximum capability can be demonstrated in continuous shooting imaging or super-slow moving picture imaging to be resumed. On the other hand, when some of the buffer memory areas are set to be subjected to deletion, picture data to be left without deleting can be generated.

In the first, second, and third embodiments, an example in which a progress indicating a progress of signal processing is displayed on a display unit (the display unit 17 or the electronic viewfinder 19) during a period until signal processing on a series of picture data is completed in the signal processing unit 20 has been described.

For example, a display as shown in B of FIG. 8 or C of FIG. 8 is performed. As a result, the user can check, for example, up to which picture the recording has been completed during consecutive shooting. The display is very useful information for determining whether the remaining pictures (unprocessed pictures) should be deleted by the operation of the forced return button 3 or whether it is better to wait more and then perform the next imaging. The user can perform an appropriate operation according to the display.

Particularly, in a case where the buffer data BDT is being completely deleted, since it is possible for the user to check whether an important scene has been recorded, the display becomes a material for determining whether to use the forced return function.

As shown in B of FIG. 8 or C of FIG. 8, in the display indicating the progress of signal processing, the recorded picture 71 is presented.

That is, from among a series of picture data obtained by continuous shooting imaging or super-slow moving picture imaging, a picture for which processing for recording on a recording medium has been completed is presented.

As a result, for example, the user can clearly recognize whether processing up to a necessary picture from among pictures obtained by continuous shooting has been completed, and thus the user can accurately determine whether operation of the forced return button 3 should be performed or the operation timing.

Particularly, when only the recorded picture 71 is displayed as shown in C of FIG. 8, the display is simplified, and it is easy for the user to recognize the display. This is suitable as a display in a case where the user wants to quickly determine whether to perform operation of the forced return button 3 in a situation in which a scene that the user wants to take picture of is in front of the user.

In the embodiment, an example in which, as a series of picture data, a plurality of pieces of still picture data input to the signal processing unit 20 by the continuous shooting imaging operation, or picture data of a plurality of frames input to the signal processing unit 20 by super-slow moving picture imaging are processed has been described. Note that the super-slow moving picture imaging is an imaging method of recording a slow motion moving picture by performing development processing at a normal frame rate while storing a moving picture read out at a high frame rate switched from a normal imaging frame rate (for example, 60 fps) in a buffer memory.

In the case of continuous shooting or super-slow moving picture shooting recording, since operation is restricted in accordance with a recordable capacity of a buffer memory, it is useful to forcibly open the buffer memory.

However, in addition to the above, the present technique may be adaptable, by keeping a balance with a signal processing speed, to a case of imaging recording a moving picture with a very large amount of data or a picture with a high frame rate.

In the embodiment, an example in which, on the housing of the imaging device 1, the forced return button 3 is provided in a state in which the forced return button 3 is unable to be operated simultaneously with an operating element (the release button 2) for imaging starting operation with one hand has been shown.

That is, the forced return button 3 for instructing the deletion of the data in the buffer memory area is arranged at a position spaced apart from the release button 2 so that the forced return button 3 is unable to be operated simultaneously with the release button 2 with one hand.

As a result, the user is prevented from performing an operation of deleting data in the buffer memory area by mistake as an imaging start operation, and thus deletion of picture data unintended by the user does not occur.

An operating element for predetermined operation for instructing a forced return is implemented with a button type forced return button 3. By being implemented in the button type, the forced return button 3 may be easily operated, and thus it is the most suitable to perform a quick operation when the user has found a scene to be imaged.

Note that the operating element for instruction deletion of data in the buffer memory area may not be a button-type operating element. For example, the operating element may also be a lever operating element, a touch operating element, or the like.

In the case of touch operation, predetermined operation may be determined in accordance with a type of touch, for example, a tap, a flick, a flicking direction, etc., and the forced return function may be performed by the operation.

Also, instead of a dedicated button such as the forced return button 3, a functional key to which the user can arbitrarily assign a function may be used as the operating element for instructing deletion of data in the buffer memory area.

Sharing the release button 2 may also be considered. For example, pressing the release button 2 for a long time or pressing the release button 2 twice may be set as predetermined operation for forced return.

Further, a gesture operation capable of being monitored by the control unit 30 by picture recognition may be used. For example, the user may perform imaging with the left hand in a predetermined shape in front of the lens barrel 8 for the control unit 30 to recognize the user's gesture as a predetermined operation.

Although the embodiments and modifications have been described above, various other modifications of the present technique may be considered.

Recording media capable of ultra high-speed writing may be developed in the future, and the media output speed may greatly exceed the development processing speed in some cases. In that case, the following may be considered.

For example, in a case where raw picture data and JPEG data are being recorded simultaneously, the recording is performed in parallel with the development processing so that the raw picture data is written in the recording medium 15*a* first. In that case, in a case where a forced return to continuous shooting is instructed, the recorded data of the raw picture data in the buffer memory area is deleted. In this state, the raw picture data has already been stored in the recording medium 15*a* so that there is no loss as a picture.

Even when recording only JPEG data, in a case in which the recording medium 15*a* has a sufficient empty space and a medium is at ultra high-speed, the recording medium 15*a* may be treated like a buffer, and the raw picture data may be recorded in parallel so that the raw picture data can be saved even at the time of forced return as in the case in which the raw picture data and the JPEG data are being recorded simultaneously.

For the saved raw picture data, it is only necessary to perform the development processing later at a timing at which continuous shooting is not performed (for example, by an instruction from the user).

In a case where a processing speed of the media output to the recording medium 15*a* is a bottleneck, and the user is not obsessed about the image quality of the JPEG data, a method in which the JPEG data is resized and the data size is reduced upon receiving an instruction for forced return, and data is deleted in the process of processing a buffer memory area while writing the data on the recording medium 15*a* at a high speed may also be considered.

In addition to the deletion of the picture data in the buffer memory area, the signal processing unit 20 may delete picture data in the processing process. For example, a case where picture data generated by arithmetic processing by the signal processing unit 20 is prevented from being written in the next buffer memory area (or from being output to the recording medium 15*a*) in accordance with operation of the forced return button 3 so that picture data being processed in the above-described first processing unit 41, second processing unit 42, third processing unit 43, etc. are discarded, may be considered.

Furthermore, in addition to being applied to deletion of picture data in the buffer memory area, the technique of the embodiment can also be applied to deletion of pictures on the recording medium 15*a*. For example, in a case where the amount of picture data recorded on the recording medium 15*a* by continuous shooting is increased by a large amount and the capacity is not sufficient, a process of completely or partially deleting picture data recorded by the immediately-preceding continuous shooting is assumed to be performed in accordance with operation of the forced return button 3. In this case, the above-described processing examples of the embodiments can be applied.

By providing a program for the processing (the processing in FIGS. 9 to 15) shown in the first, second, and third embodiments, it is easy to realize the imaging device 1 according to the present embodiment.

Such a program can be pre-stored in a recording medium incorporated in a device such as a computer device or in a ROM or the like in a microcomputer having a CPU. Alternatively, such a program can be temporarily or permanently stored (stored) in a removable recording medium such as a semiconductor memory, a memory card, an optical disk, a magneto-optical disk, or a magnetic disk. Such a removable recording medium can be provided as so-called packaged software.

In addition to installing such a program from a removable recording medium into a personal computer or the like, the program can also be downloaded from a download site via a network such as a local area network (LAN) or the Internet.

However, the advantageous effects described herein are merely illustrative and are not limited, and other advantageous effects may also be obtained.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An imaging device comprising:

a signal processor configured to perform a first signal processing to temporarily store a series of continuously acquired image data in a buffer memory area, to read out the series of image data from the buffer memory area, and to perform a second signal processing that is subsequent to the first signal processing; and a controller configured to obviate at least a part of the image data stored in the buffer memory area following detection of a predetermined operation during execution of the first signal processing on the series of image data.

(2)

The imaging device according to (1), wherein obviating at least a part of the image data stored in the buffer memory area includes deletion of the image data stored in the buffer memory area when a remaining storage capacity of the buffer memory area is less than a predetermined amount.

(3)

The imaging device according to (1), wherein obviating at least a part of the image data stored in the buffer memory area includes deletion of the image data stored in the buffer memory area in accordance with detecting an imaging starting operation for the series of image data in addition to detecting the predetermined operation.

(4)

The imaging device according to (1), wherein obviating at least a part of the image data stored in the buffer memory area includes deletion of the image data stored in the buffer memory area in accordance with only a condition of detecting the predetermined operation.

(5)

The imaging device according to (1), wherein the first signal processing is a different signal processing from the second signal processing.

(6)

The imaging device according to (5), wherein the signal processor prepares a plurality of buffer memory areas to store the image data of at least the first signal processing and the second signal processing, and in accordance with the predetermined operation, the controller commands the signal processor to obviate the image data by completely or partially deleting the image data stored in the plurality of buffer memory areas.

(7)

The imaging device according to (5), wherein the signal processor prepares a plurality of buffer memory areas to store the image data of at least the first signal processing and the second signal processing, and in accordance with the predetermined operation, the controller commands the signal processor to obviate the image data by completely or partially deleting the image data stored in at least one of the buffer memory areas.

(8)

The imaging device according to (7), wherein the at least one of the buffer memory areas is a first buffer memory area that is used to store image data during a signal processing executed by the signal processor.

(9)

The imaging device according to (1), wherein when the controller commands the signal processor to obviate the image data by partially deleting the image data stored in the buffer memory area, the controller first deletes the image data in the buffer memory area with imaging time for the longest period of time.

(10)

The imaging device according to (1), wherein when the controller commands the signal processor to obviate the image data by partially deleting the image data stored in the buffer memory area, the controller first deletes the image data in the buffer memory area with imaging time for the shortest period of time.

(11)

The imaging device according to (1), wherein when the controller commands the signal processor to obviate the image data by partially deleting the image data stored in the buffer memory area, the controller performs a thinning deletion for a series of image data, the thinning deletion being configured to delete the image data in order of an imaging time period length of the image data stored in the buffer memory area.

(12)

The imaging device according to (1), wherein when the controller commands the signal processor to obviate the image data by partially deleting the image data stored in the buffer memory area, the controller deletes a picture selected from among the image data stored in the buffer memory area using a predetermined condition.

(13)

The imaging device according to (1), wherein when the controller commands the signal processor to obviate the image data by deleting the image data stored in the buffer memory area, the controller deletes all image data stored in the buffer memory area except for the image data currently being read out from the buffer memory area.

(14)

The imaging device according to (1), wherein when the controller commands the signal processor to obviate the image data by deleting the image data stored in the buffer memory area, the controller deletes image data stored in the buffer memory area by selecting one of a plurality of deletion processing methods.

(15)

The imaging device according to (1), wherein the controller controls a display indicating a progress of signal processing until the signal processor completes signal processing for the series of image data.

(16)

The imaging device according to (15), wherein the display indicating the progress presents a picture that has completed the signal processing for recording on a recording medium, the picture being from among the series of image data.

(17)

The imaging device according to (1), wherein the series of image data is a plurality of pieces of still image data input by a continuous shooting imaging operation.

(18)

The imaging device according to (1), wherein the series of image data is image data of a plurality of frames input by a moving picture imaging operation that switched from a normal imaging frame rate to a high imaging frame rate.

(19A)

The imaging device according to (1), further comprising a housing including a first operating element for the predetermined operation and a second operating element for an imaging starting operation, wherein the first operating element is unable to be operated simultaneously with the second operating element with one hand.

(19B)

The imaging device according to (1), further comprising an operating element for the predetermined operation, wherein the operating element is a button-type operating element.

(20)

An imaging method of an imaging device including a signal processor configured to perform a first signal processing to temporarily store a series of continuously acquired image data in a buffer memory area, to read out the series of image data from the buffer memory area, and to perform a second signal processing that is subsequent to the first signal processing, the imaging method comprising:

detecting a predetermined operation during execution of the first signal processing on the series of image data obtained by an imaging operation; and obviating at least a part of the image data stored in the buffer memory area following detection of the predetermined operation.

(21)

An imaging device including:

a signal processing unit configured to cause a series of picture data being continuously acquired to be temporarily stored in a buffer memory area in a signal processing process, read out the series of picture data from the buffer memory area, and perform a subsequent signal processing; and a control unit configured to perform control for deleting at least a part of the picture data stored in the buffer memory area, on a basis of detecting a predetermined operation while the signal processing is being performed on the series of picture data by the signal processing unit.

(22)

The imaging device according to (21), in which the control unit causes the deletion of the picture data stored in the buffer memory area to be executed in a case where a storable capacity of the buffer memory area is less than a predetermined amount.

(23)

The imaging device according to (21) or (22), in which the control unit causes the deletion of the picture data stored in the buffer memory area to be executed in accordance with detecting an imaging starting operation for the series of picture data in addition to detecting the predetermined operation.

(24)

The imaging device according to (21) or (22), in which the control unit causes the deletion of the picture data stored in the buffer memory area to be executed in accordance with only a condition of detecting the predetermined operation.

(25)

The imaging device according to any one of (21) to (24), in which a plurality of buffer memory areas in which the signal processing unit buffers picture data of different signal processing steps are prepared, and in accordance with the predetermined operation, the control unit causes the signal processing unit to execute complete or partial deletion of the picture data stored in the plurality of buffer memory areas.

(26)

The imaging device according to any one of (21) to (24), in which a plurality of buffer memory areas in which the signal processing unit buffers picture data of different signal processing steps are prepared, and in accordance with the predetermined operation, the control unit causes the signal processing unit to execute complete or partial deletion of the picture data stored in a part of the buffer memory areas.

(27)

The imaging device according to (26), in which the part of the buffer memory areas is a first buffer memory area that is used in a signal processing process in the signal processing unit.

(28)

The imaging device according to any one of (21) to (27), in which, in a case where the control unit causes partial deletion of the picture data stored in the buffer memory area to be executed, the control unit causes picture data whose imaging time is the oldest to be deleted first from among the picture data stored in the buffer memory area.

(29)

The imaging device according to any one of (21) to (27), in which, in a case where the control unit causes partial deletion of the picture data stored in the buffer memory area to be executed, the control unit causes picture data whose imaging time is the newest to be deleted first from among the picture data stored in the buffer memory area.

(30)

The imaging device according to any one of (21) to (27), in which, in a case where the control unit causes partial deletion of the picture data stored in the buffer memory area to be executed, the control unit causes thinning deletion to be performed for a series of picture data in order of imaging time stored in the buffer memory area.

(31)

The imaging device according to any one of (21) to (27), in which, in a case where the control unit causes partial deletion of the picture data stored in the buffer memory area to be executed, the control unit causes a picture to be deleted to be selected from among the picture data stored in the buffer memory area using a predetermined condition and be deleted.

(32)

The imaging device according to any one of (21) to (27), in which, in a case where the control unit causes deletion of the picture data stored in the buffer memory area to be executed, the control unit causes the deletion of the picture data to be executed except for picture data being read out from the buffer memory area.

(33)

The imaging device according to any one of (21) to (27), in which, in a case where the control unit causes deletion of the picture data stored in the buffer memory area to be executed, the control unit causes the deletion of the picture data stored in the buffer memory area to be executed by selecting one of a plurality of deletion processing methods.

(34)

The imaging device according to any one of (21) to (33), in which the control unit performs control for a display indicating a progress of signal processing to be executed by a display unit during a period until signal processing for the series of picture data is completed by the signal processing unit.

(35)

The imaging device according to (34), in which, in the display indicating the progress, a picture on which processing for recording on a recording medium has been completed is presented from among the series of picture data.

(36)

The imaging device according to any one of (21) to (35), in which the series of picture data is a plurality of pieces of still picture data input by a continuous shooting imaging operation.

(37)

The imaging device according to any one of (21) to (35), in which the series of picture data is picture data of a plurality of frames input by a moving picture imaging operation of a high frame rate switched from a normal imaging frame rate.

(38)

The imaging device according to any one of (21) to (37), in which, on a housing, an operating element for the predetermined operation is provided in a state in which the operating element is unable to be operated simultaneously with an operating element for an imaging starting operation with one hand.

(39)

The imaging device according to any one of (21) to (38), in which an operating element for the predetermined operation is a button-type operating element.

(40)

An imaging method of an imaging device including a signal processing unit configured to cause a series of picture data being continuously acquired to be temporarily stored in a buffer memory area in a signal processing process, read out the series of picture data from the buffer memory area, and perform a subsequent signal processing, the imaging method including:

a procedure of detecting a predetermined operation while signal processing is being performed by the signal processing unit on a series of picture data obtained by an imaging operation; and a procedure of causing deletion of at least a part of the picture data stored in the buffer memory area to be executed on a basis of the detecting of the predetermined operation.

REFERENCE SIGNS LIST 1 imaging device
2 release button
3 forced return button
4 button
5 dial
8 lens barrel
9 grip portion
11 optical system
12 image sensor
13 optical system drive unit
14 sensor unit
15 recording unit
15a recording medium
16 communication unit
17 display unit
18 operation unit
19 electronic viewfinder
20 signal processing unit
30 control unit
41 first processing unit
42 second processing unit
43 third processing unit
44 fourth processing unit
51 first buffer
52 second buffer
53 third buffer

The invention claimed is:

1. An imaging device comprising:

a signal processor configured to perform a first signal processing for a first image capturing operation responsive to a first actuation of a first button, the first image capturing operation being a continuous shooting imaging operation, the first signal processing including temporarily storing a series of continuously acquired image data in a buffer memory area and reading out the series of image data from the buffer memory area, the signal processor being further configured to perform a second signal processing that is subsequent to the first signal processing, the second signal processing being for a second image capturing operation responsive to a second actuation of the first button, the second image capturing operation being separate and distinct from the first image capturing operation; and a controller configured to obviate at least a part of the image data stored in the buffer memory area following detection of a predetermined operation during execution of the first signal processing to allow the second signal processing to be performed immediately following the second actuation of the first button, wherein the predetermined operation is responsive to actuation of a second button that is distinct from the first button.

2. The imaging device according to claim 1, wherein obviating at least a part of the image data stored in the buffer memory area includes deletion of the image data stored in the buffer memory area when a remaining storage capacity of the buffer memory area is less than a predetermined amount.

3. The imaging device according to claim 1, wherein obviating at least a part of the image data stored in the buffer memory area includes deletion of the image data stored in the buffer memory area in accordance with detecting an imaging starting operation for the series of image data in addition to detecting the predetermined operation.

4. The imaging device according to claim 1, wherein obviating at least a part of the image data stored in the buffer memory area includes deletion of the image data stored in the buffer memory area in accordance with only a condition of detecting the predetermined operation.

5. The imaging device according to claim 1, wherein the first signal processing is a different signal processing from the second signal processing.

6. The imaging device according to claim 5, wherein the signal processor prepares a plurality of buffer memory areas to store the image data of at least the first signal processing and the second signal processing, and in accordance with the predetermined operation, the controller commands the signal processor to obviate the image data by completely or partially deleting the image data stored in the plurality of buffer memory areas.

7. The imaging device according to claim 5, wherein the signal processor prepares a plurality of buffer memory areas to store the image data of at least the first signal processing and the second signal processing, and in accordance with the predetermined operation, the controller commands the signal processor to obviate the image data by completely or partially deleting the image data stored in at least one of the buffer memory areas.

8. The imaging device according to claim 7, wherein the at least one of the buffer memory areas is a first buffer memory area that is used to store image data during a signal processing executed by the signal processor.

9. The imaging device according to claim 1, wherein when the controller commands the signal processor to obviate the image data by partially deleting the image data stored in the buffer memory area, the controller first deletes the image data in the buffer memory area with imaging time for the longest period of time.

10. The imaging device according to claim 1, wherein when the controller commands the signal processor to obviate the image data by partially deleting the image data stored in the buffer memory area, the controller first deletes the image data in the buffer memory area with imaging time for the shortest period of time.

11. The imaging device according to claim 1, wherein when the controller commands the signal processor to obviate the image data by partially deleting the image data stored in the buffer memory area, the controller performs a thinning deletion for a series of image data, the thinning deletion being configured to delete the image data in order of an imaging time period length of the image data stored in the buffer memory area.

12. The imaging device according to claim 1, wherein when the controller commands the signal processor to obviate the image data by partially deleting the image data stored in the buffer memory area, the controller deletes a picture selected from among the image data stored in the buffer memory area using a predetermined condition.

13. The imaging device according to claim 1, wherein when the controller commands the signal processor to obviate the image data by deleting the image data stored in the buffer memory area, the controller deletes all image data stored in the buffer memory area except for the image data currently being read out from the buffer memory area.

14. The imaging device according to claim 1, wherein when the controller commands the signal processor to obviate the image data by deleting the image data stored in the buffer memory area, the controller deletes image data stored in the buffer memory area by selecting one of a plurality of deletion processing methods.

15. The imaging device according to claim 1, wherein the first image capturing operation and the second image capturing operation are continuous image shooting operations.

16. The imaging device according to claim 1, wherein the second button is arranged at a location away from the first button such that the second button and first button are unable to be simultaneously actuated with one hand.

17. An imaging method of an imaging device including a signal processor configured to perform a first signal processing for a first image capturing operation responsive to a first actuation of a first button, the first image capturing operation being a continuous shooting imaging operation, the first signal processing including temporarily storing a series of continuously acquired image data in a buffer memory area and reading out the series of image data from the buffer memory area, the signal processing being further configured to perform a second signal processing that is subsequent to the first signal processing, the second signal processing being for a second image capturing operation responsive to a second actuation of the first button, the second image capturing operation being separate and distinct from the first image capturing operation, the imaging method comprising:
  detecting a predetermined operation during execution of the first signal processing on the series of image data; and
  obviating at least a part of the image data stored in the buffer memory area following detection of the predetermined operation to allow the second signal processing to be performed immediately following the second actuation of the first button, wherein
  the predetermined operation is responsive to actuation of a second button that is distinct from the first button.

18. The imaging method according to claim 17, wherein the first image capturing operation and the second image capturing operation are continuous image shooting operations.

* * * * *